United States Patent
Park et al.

(10) Patent No.: US 11,206,711 B2
(45) Date of Patent: Dec. 21, 2021

(54) DATA TRANSMISSION/RECEPTION METHOD AND APPARATUS IN WIRELESS COMMUNICATION SYSTEM THAT SUPPORTS MULTI-RADIO ACCESS TECHNOLOGY

(71) Applicant: Samsung Electronics Co., Ltd., Suwon-si (KR)

(72) Inventors: Jung-Shin Park, Seoul (KR); Ki-Suk Kweon, Suwon-si (KR); Sang-Jun Moon, Seoul (KR); Ji-Cheol Lee, Suwon-si (KR); Jin-Sung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 22 days.

(21) Appl. No.: 16/625,619

(22) PCT Filed: Oct. 19, 2018

(86) PCT No.: PCT/KR2018/012439
§ 371 (c)(1),
(2) Date: Dec. 20, 2019

(87) PCT Pub. No.: WO2019/078683
PCT Pub. Date: Apr. 25, 2019

(65) Prior Publication Data
US 2020/0187301 A1    Jun. 11, 2020

(30) Foreign Application Priority Data

Oct. 20, 2017    (KR) ........................ 10-2017-0136948

(51) Int. Cl.
*H04W 88/06*    (2009.01)
*H04L 29/08*    (2006.01)
(Continued)

(52) U.S. Cl.
CPC ............. *H04W 88/06* (2013.01); *H04L 67/14* (2013.01); *H04W 8/08* (2013.01); *H04W 48/18* (2013.01); *H04W 60/005* (2013.01); *H04W 88/16* (2013.01)

(58) Field of Classification Search
CPC ........... H04W 36/0027; H04W 36/022; H04W 36/00837; H04W 36/0066; H04W 76/12;
(Continued)

(56) References Cited

U.S. PATENT DOCUMENTS

| 5,519,780 | A | * | 5/1996 | Woo | ........................ | H04N 7/025 |
| | | | | | | 348/467 |
| 8,494,543 | B2 | * | 7/2013 | Koodli | .............. | H04W 36/0027 |
| | | | | | | 455/453 |

(Continued)

FOREIGN PATENT DOCUMENTS

| EP | 2975882 | A1 | * | 1/2016 | | |
| EP | 2975882 | B1 | * | 7/2018 | ............ | H04W 36/14 |

(Continued)

OTHER PUBLICATIONS

A Survey on Handover Management: From LTE to NR by Muhammad Tayyab; Xavier Gelabert; Riku Jäntti Published in: IEEE Access (vol. 7) Aug. 2019 (Year: 2019).*

(Continued)

*Primary Examiner* — William D Cumming

(57) ABSTRACT

A 5G or pre-5G communication system is provided to support higher data transmission rates after 4G communication systems such as LTE. To support communication of a terminal that dually accesses a first radio access technology (RAT) communication system and a second RAT communication system, a session generation request message for transmitting traffic is received from a terminal. A target communication system that is to generate a data path with respect to the traffic from the first RAT communication (Continued)

system and the second RAT communication system is determined, the data path for the target communication system is configured, and information about the configured data path is transmitted to the terminal.

14 Claims, 22 Drawing Sheets

(51) Int. Cl.
  *H04W 8/08* (2009.01)
  *H04W 48/18* (2009.01)
  *H04W 60/00* (2009.01)
  *H04W 88/16* (2009.01)

(58) Field of Classification Search
  CPC .. H04W 48/18; H04W 48/16; H04W 52/0264
  USPC ........ 370/235, 312, 329, 338, 331; 455/453, 455/434, 419, 436, 406
  See application file for complete search history.

(56) References Cited

U.S. PATENT DOCUMENTS

| | | | |
|---|---|---|---|
| 8,693,456 B2* | 4/2014 | Liu | H04L 47/125 370/338 |
| 9,288,749 B2* | 3/2016 | Lee | H04W 48/16 |
| 9,622,134 B2* | 4/2017 | Sundararajan | H04W 36/0066 |
| 9,961,624 B1* | 5/2018 | Zait | H04W 48/16 |
| 10,212,693 B2* | 2/2019 | Agarwal | H04W 64/00 |
| 10,382,948 B2* | 8/2019 | Stammers | H04W 76/12 |
| 10,455,629 B2* | 10/2019 | Han | H04W 76/12 |
| 10,542,449 B2* | 1/2020 | Jung | H04W 88/08 |
| 10,560,887 B2* | 2/2020 | Sundararajan | H04W 36/14 |
| 10,693,918 B2* | 6/2020 | Verma | H04W 12/128 |
| 10,728,817 B1* | 7/2020 | Kaki | H04W 36/0022 |
| 10,735,943 B2* | 8/2020 | Cho | H04W 8/08 |
| 10,743,361 B2* | 8/2020 | Youn | H04W 76/10 |
| 10,764,376 B2* | 9/2020 | Stammers | H04L 61/203 |
| 10,764,443 B2* | 9/2020 | Tamura | H04W 76/00 |
| 10,812,532 B2* | 10/2020 | Verma | H04L 63/0272 |
| 10,887,806 B2* | 1/2021 | Patil | H04W 36/0069 |
| 2004/0184435 A1 | 9/2004 | Westman | |
| 2009/0156213 A1 | 6/2009 | Spinelli et al. | |
| 2010/0091653 A1* | 4/2010 | Koodli | H04W 36/0027 370/235 |
| 2010/0150049 A1* | 6/2010 | Kim | H04W 76/12 370/312 |
| 2011/0158162 A1 | 6/2011 | Mizikovsky et al. | |
| 2012/0044908 A1 | 2/2012 | Spinelli et al. | |
| 2013/0016696 A1 | 1/2013 | Adjakple et al. | |
| 2013/0121282 A1* | 5/2013 | Liu | H04L 47/125 370/329 |
| 2013/0155964 A1 | 6/2013 | Miller et al. | |
| 2013/0196661 A1* | 8/2013 | Lee | H04W 48/18 455/434 |
| 2013/0329694 A1 | 12/2013 | Vrzic et al. | |
| 2014/0194111 A1* | 7/2014 | Aso | H04W 52/0264 455/419 |
| 2014/0233380 A1 | 8/2014 | Kim et al. | |
| 2014/0235242 A1 | 8/2014 | Granzow et al. | |
| 2014/0328318 A1* | 11/2014 | Sundararajan | H04W 36/22 370/331 |
| 2014/0329526 A1* | 11/2014 | Sundararajan | H04W 36/00837 455/436 |
| 2015/0327117 A1 | 11/2015 | Sirotkin | |
| 2016/0066261 A1* | 3/2016 | Nasielski | H04M 15/8044 455/406 |
| 2016/0095108 A1 | 3/2016 | Ryoo et al. | |
| 2016/0219470 A1 | 7/2016 | Jheng et al. | |
| 2017/0245207 A1* | 8/2017 | Stammers | H04W 8/24 |
| 2018/0077682 A1* | 3/2018 | Li | H04W 68/005 |
| 2018/0092142 A1* | 3/2018 | Han | H04W 36/38 |
| 2018/0109632 A1* | 4/2018 | Stammers | H04L 67/1004 |
| 2018/0288233 A1* | 10/2018 | Tamura | H04W 36/28 |
| 2018/0317118 A1* | 11/2018 | Jung | H04W 48/18 |
| 2019/0053306 A1* | 2/2019 | Cho | H04W 8/08 |
| 2019/0150225 A1* | 5/2019 | Mohamed | H04W 76/12 370/329 |
| 2019/0174009 A1* | 6/2019 | Tamura | H04L 12/1407 |
| 2019/0223131 A1* | 7/2019 | Zhang | H04W 60/005 |
| 2019/0364419 A1* | 11/2019 | Stammers | H04W 76/12 |
| 2019/0387401 A1* | 12/2019 | Liao | H04W 12/082 |
| 2020/0092932 A1* | 3/2020 | Youn | H04W 76/20 |
| 2020/0107293 A1* | 4/2020 | Cui | H04W 76/25 |
| 2020/0169853 A1* | 5/2020 | Tamura | H04W 16/14 |
| 2020/0169934 A1* | 5/2020 | Sundararajan | H04W 36/00 |
| 2020/0187301 A1* | 6/2020 | Park | H04W 8/08 |
| 2020/0205212 A1* | 6/2020 | Rahman | H04W 74/0816 |
| 2020/0245209 A1* | 7/2020 | Patil | H04W 76/12 |
| 2020/0260505 A1* | 8/2020 | Benson | H04W 76/10 |
| 2020/0260506 A1* | 8/2020 | Benson | H04W 76/10 |
| 2020/0272525 A1* | 8/2020 | Radunovic | G06F 9/5083 |
| 2020/0296647 A1* | 9/2020 | Kaki | H04W 36/14 |
| 2020/0344831 A1* | 10/2020 | Youn | H04W 80/02 |
| 2020/0351407 A1* | 11/2020 | Tamura | H04L 12/1407 |
| 2020/0359429 A1* | 11/2020 | Benson | H01M 50/147 |
| 2020/0367190 A1* | 11/2020 | Wang | H04W 36/0072 |
| 2021/0092591 A1* | 3/2021 | Vallee | H04W 24/02 |
| 2021/0185585 A1* | 6/2021 | Chen | H04W 36/0066 |
| 2021/0219359 A1* | 7/2021 | Lubenski | H04W 48/00 |

FOREIGN PATENT DOCUMENTS

| | | |
|---|---|---|
| KR | 10-2016-0037051 A | 4/2016 |
| WO | 2016126238 A1 | 8/2016 |

OTHER PUBLICATIONS

I. Zubeiri and F. Mrabti, "A comparative study of interworking methods among differents rats in 5G context," 2017 International Conference on Advanced Technologies for Signal and Image Processing (ATSIP), 2017, pp. 1-5, doi: 10.1109/ATSIP.2017.8075585. Oct. 2017 (Year: 2017).*

ISA/KR, International Search Report and Written Opinion of the International Searching Authority, International Application No. PCT/KR2018/012439, dated Jan. 16, 2019, 13 pages.

Notification of the Reasons for Rejection dated Aug. 25, 2021 in connection with Korean Application No. 10-2017-0136948, 10 pages.

* cited by examiner

DATA TRANSMISSION/RECEPTION METHOD AND APPARATUS IN WIRELESS COMMUNICATION SYSTEM THAT SUPPORTS MULTI-RADIO ACCESS TECHNOLOGY

CROSS-REFERENCE TO RELATED APPLICATIONS

This application is a National Phase Entry of PCT International Application No. PCT/KR2018/012439, which was filed on Oct. 19, 2018, and claims priority to Korean Patent Application No. 10-2017-0136948, which was filed on Oct. 20, 2017, the content of each of which are incorporated herein by reference.

1. Field

The present disclosure relates to an apparatus and method for transmitting and receiving data in a wireless communication system that supports a multi-radio access technology. The present disclosure relates to an apparatus and method for controlling a traffic path in a wireless communication system that supports a multi-radio access technology.

2. Description of Related Art

To satisfy demands for wireless data traffic having increased since commercialization of 4th-Generation (4G) communication systems, efforts have been made to develop improved 5th-Generation (5G) communication systems or pre-5G communication systems. For this reason, the 5G communication system or the pre-5G communication system is also called a beyond-4G-network communication system or a post-Long Term Evolution (LTE) system.

For higher data transmission rates, 5G communication systems are considered to be implemented on ultra-high frequency bands (mmWave), such as, e.g., 60 GHz. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

A 5G network technology, which is a follow-up technology of a 4G LTE mobile communication technology, aims at an end-to-end (E2E) system in which all targets (a technology, a domain, a layer, equipment/device, user interaction, etc.) accessing a network in various ways as well as in a wired manner converge to a high degree. To this end, a system and a network architecture in a totally new clean slate form is being designed to implement wireless and wired network technologies having high-performance, low-latency, high-availability, etc., which is led by standardization groups such as the International Telecommunication Union Radio communication sector (ITU-R), the International Telecommunication Union Telecommunication Standardization Sector (ITU-T), the Next Generation Mobile Networks (NGMN), the 3rd Generation Partnership Project (3GPP), etc.

Meanwhile, a multi-radio access technology (RAT) has been studied in which heterogeneous communication networks converge and operate. For example, a multi-RAT user equipment (UE) supports both a cellular network and a wireless local area network (WLAN). The multi-RAT UE may be able to access any one of multiple RATs selectively, but not be able to access the multiple RATs simultaneously (or dually). That is, even when the UE currently has a multi-RAT capability, the UE may not be able to transmit and receive data simultaneously through different RATs. When different RATs operate independently of one another, there is a limitation in that the entire system operates organically.

SUMMARY

According to the present disclosure, there is provided an apparatus and method for transmitting and receiving data in a wireless communication system that supports a multi-radio access technology.

According to the present disclosure, there is provided an apparatus and method for controlling a traffic transmission path (or data path) in a wireless communication system that supports a multi-radio access technology.

According to the present disclosure, there is provided an apparatus and method for supporting dual registration, double registration, or simultaneous registration of a 4G network and a 5G network in a wireless communication system that supports a multi-radio access technology.

According to the present disclosure, there is provided an apparatus and method for supporting interworking between a 4G network and a 5G network in a wireless communication system that supports a multi-radio access technology.

According to the present disclosure, there is provided an apparatus and method for supporting interworking between a 4G network and a 5G network based on dual registration in a wireless communication system that supports a multi-radio access technology.

According to the present disclosure, when interworking between the 4G network and the 5G network is applied based on dual registration in a wireless communication system that supports a multi-radio access technology, a network may select a 4G system and a 5G system based on a service type to designate and control a system for use in a UE.

According to the present disclosure, there is provided an apparatus and method for controlling a data transmission path between a 4G network and a 5G network based on a service type requested or used in a UE when interworking between the 4G network and the 5G network is applied based on dual registration in a wireless communication system that supports a multi-radio access technology.

The present disclosure also provides an apparatus for designating and controlling a data transmission path on a service basis for a UE using 5G and 4G mobile communication systems, and an operation method of the apparatus.

An operation method of an apparatus for supporting communication of a user equipment (UE) that dually accesses a first radio access technology (RAT) communication system and a second RAT communication system according to the present disclosure includes receiving a session create request message for traffic transmission from the UE, determining a target communication system to be used to create a data path for the traffic between the first RAT communication system and the second RAT communication system, setting the data path in the target communication system, and transmitting information about the set data path to the UE.

An apparatus for supporting communication of a UE that dually accesses a first RAT communication system and a second RAT communication system according to the present disclosure includes a transceiver and a controller configured to control the transceiver, in which the controller is configured to receive a session create request message for traffic transmission from the UE, to determine a target communication system to be used to create a data path for the traffic between the first RAT communication system and the second RAT communication system, to set the data path in the target communication system, and to transmit information about the set data path to the UE.

A UE that dually accesses a first RAT communication system and a second RAT communication system according to the present disclosure includes a transceiver and a controller configured to control the transceiver, in which the controller is configured to transmit a session create request message for transmission of traffic to one of a session management function (SMF) of a 5th-Generation (5G) communication system, a packet data network (PDN) gateway-control (PGW-C) of a 4th-Generation (4G) communication system, or an SMG/PGW-C collocated function, to receive information about the data path set for the traffic from one of the SMF, the PGW-C, or the SMG/PGW-C collocated function, and to receive the traffic from one of the first RAT communication system and the second RAT communication system through the set data path.

A communication method of a UE that dually accesses a first RAT communication system and a second RAT communication system according to the present disclosure includes transmitting a session create request message for transmission of traffic to one of an SMF of a 5G communication system, a PGW-C of a 4G communication system, or an SMG/PGW-C collocated function, receiving information about the data path set for the traffic from one of the SMF, the PGW-C, or the SMG/PGW-C collocated function, and receiving the traffic from one of the first RAT communication system and the second RAT communication system through the set data path.

According to the present disclosure, when interworking between a 4G network and a 5G network is applied in a wireless communication system that supports a multi-radio access technology, a network available to a UE may be efficiently selected depending on a network status.

According to the present disclosure, when interworking between a 4G network and a 5G network is applied in a wireless communication system that supports a multi-radio access technology, a network available to a UE may be efficiently selected depending on a service type requested or currently used by the UE.

According to the present disclosure, when a 4G network and a 5G network are simultaneously (or dually) used in a wireless communication system that supports a multi-radio access technology, a network may be used differentially for each service.

According to the present disclosure, when interworking between a 4G network and a 5G network is applied in a wireless communication system that supports a multi-radio access technology, a network available to a UE may be efficiently selected depending on a policy of a communication operator.

According to the present disclosure, a data transmission path of a UE may be switched by adding a simple network function (NF) of a new facility, without changing implementation of a 5G base station (BS) and a 4G BS.

According to the present disclosure, without changing functions of a 5G BS and a 4G BS, different qualities of service (QoS) and transmission path units may be supported in a 5G network and a 4G network.

DETAILED DESCRIPTION

Figure 1:
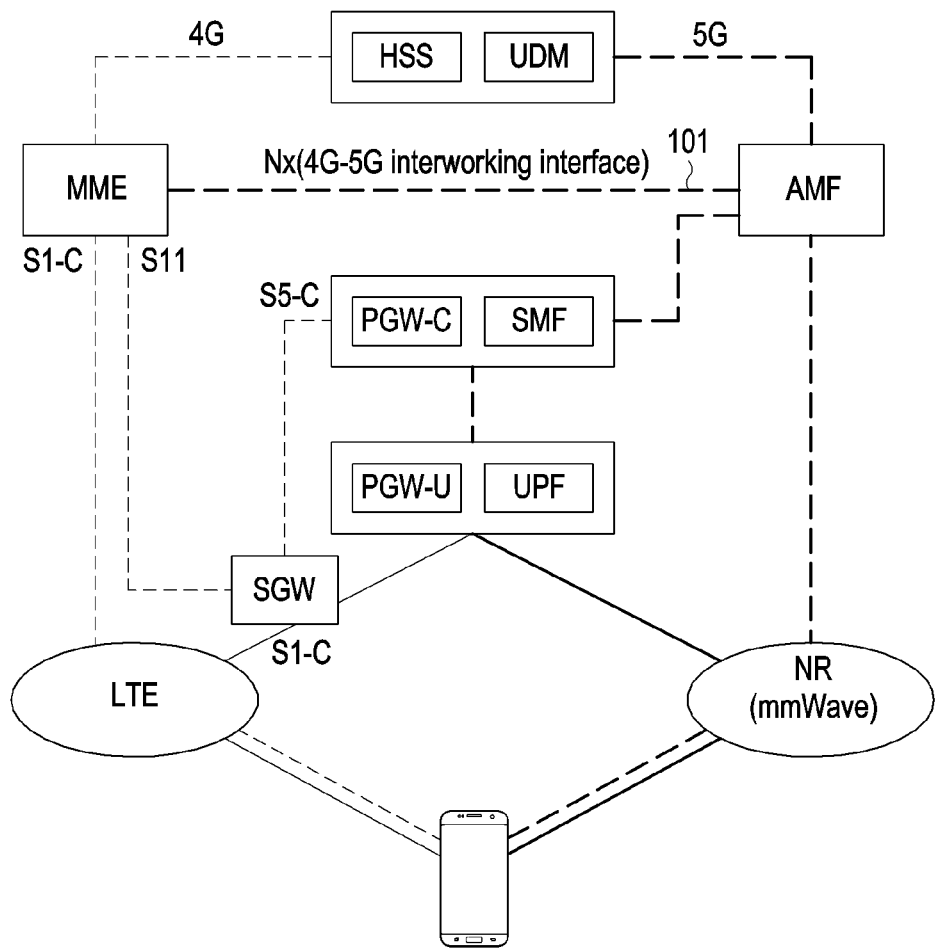
FIG. 1 illustrates a wireless communication network architecture supporting interworking between a 4G network and a 5G network based on single registration.

Various changes may be made to the present disclosure and the present disclosure may have various embodiments which will be described in detail with reference to the drawings. However, the present disclosure is not construed as limited to specified embodiments, and includes all changes, equivalents, or substitutes that do not depart from the spirit and technical scope of the present disclosure.

Terms such as first, second, and the like may be used to describe various elements, but the elements should not be limited to those terms. These terms may be used for the purpose of distinguishing one element from another element.

The terms used in the present disclosure are for the purpose of describing particular exemplary embodiments only and are not intended to limit an application range or purpose. As used herein, the singular forms are intended to include the plural forms as well, unless the context clearly indicates otherwise. Herein, it will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

Hereinbelow, various embodiments will be described in detail with reference to the accompanying drawings, and identical or corresponding components will be given identical reference numerals and a repetitive description of the corresponding components will be avoided.

Before detailing the present disclosure, some terms as used herein may be interpreted as follows, for example. However, it should be noted that the present disclosure is not limited thereto.

A base station is an entity communicating with a UE and may be denoted a BS, a NodeB (NB), an evolved NodeB (eNB), a gNB, or an access point (AP).

A user equipment (UE) is an entity that communicates with the BS, and may also be referred to as a UE, a mobile station (MS), mobile equipment (ME), a device, a terminal, or the like.

At present, standardization for 5G communication standards is being actively progressing, and a 5G service is expected to start around 2020. A new 5G network for providing a 5G service is expected to provide a service to a mobile communication UE while coexisting with a conventionally established 4G network for awhile from its early stage, and to solve a problem of service discontinuity due to a limited service coverage in an initial phase of 5G, a function of providing a service without discontinuity through interworking with a 4G network needs to be necessarily considered. An ultrahigh frequency (mmWave) band being considered as a 5G communication band is proper for a broadband high-speed service, whereas due to a small cell radius and vulnerability to a path loss, a limitation is expected to occur in corresponding mobility management of a UE, demanding a 4G-5G interworking technique for supplementing the limitation by using the 4G network.

When a UE moves beyond a 5G service coverage to an area where only a 4G service is possible or moves from a 4G service area to an area where a 5G service is possible, and thus intends to change a network to be used, overall operations and procedures of a UE, a 4G network, and a 5G network for providing a continuous service to the UE is referred to as interworking between the 4G network and the 5G network, and such interworking includes single registration-based interworking and dual registration-based interworking.

FIG. 1 illustrates a wireless communication network architecture supporting interworking between a 4G network and a 5G network based on single registration for application of various embodiments.

Referring to FIG. 1, in single registration-based interworking, a UE accesses one of a 4G network and a 5G network at an instant for communication, such that when the UE moves to a service area of the 4G network or 5G network, status information of the UE is delivered from a currently accessing network to a designation network to enable a continuous service. This scheme requires a new interface 101 for interworking between the 4G network and the 5G network.

Figure 2:
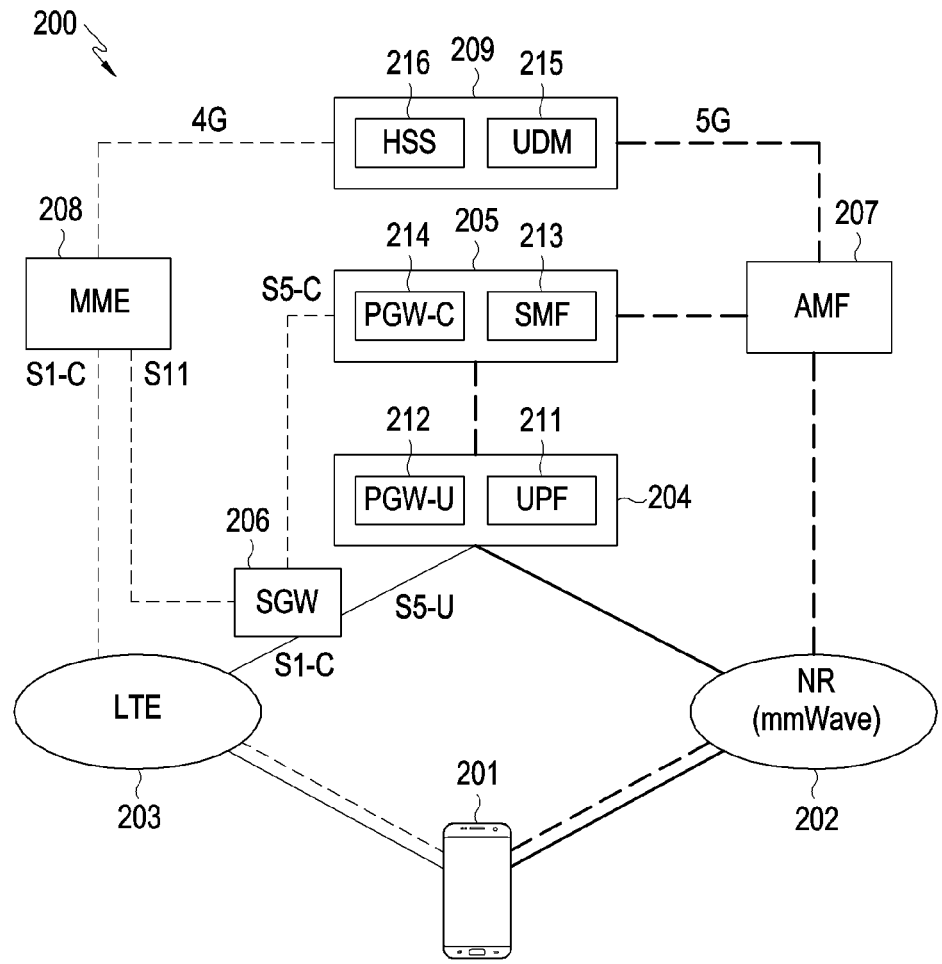
FIG. 2 illustrates a wireless communication network architecture supporting interworking between a 4G network and a 5G network based on dual registration.

FIG. 2 illustrates a wireless communication network architecture supporting interworking between a 4G network and a 5G network based on dual registration, according to the present disclosure.

According to various embodiments of the present disclosure, in an environment where the 4G network and the 5G network coexist, a communication service may be provided to a 4G and 5G dual accessible UE through the 4G and 5G networks.

As shown in FIG. 2, a UE 201 may separately access a 4G network and a 5G network and may support a function of dually accessing the 4G network and the 5G network.

For example, the 4G network may include a mobility management entity (MME) 208, a serving gateway (SGW) 206, and an eNodeB (eNB) 203, and may include a PGW-control plane (PGW-C) 214, a PGW-user plane (PGW-U) 212, and a home subscriber server (HSS) 216 which are collocated functions with the 5G network.

For example, the 5G network may include an access and mobility management function (AMF) 207 and a new radio (NR) BS 202, and may include a session management function (SMF) 213, a user plane function (UPF) 211, and unified data management (UDM) 215 which are collocated functions with the 4G network.

The PGW-C 214 and the SMF 213, the PGW-U 212 and the UPF 211, and the HSS 216 and the UDM 215 may be implemented as one collocated function, respectively, and may be used in common by 4G and 5G network operations.

Dual registration-based interworking according to the present disclosure may reset a data delivery path when the UE maintains a state of accessing both the 4G network and the 5G network and moves service areas of the 4G network and the 5G network. Thus, the UE may use a continuous communication service. Therefore, dual registration-based interworking according to the present disclosure may not require implementation of a new interface between the 4G network and the 5G network.

A wireless communication system according to the present disclosure may provide a data synchronization scheme between a 4G BS and a 5G BS to prevent a possible packet loss in application of dual registration-based interworking.

In application of dual registration-based interworking according to the present disclosure, the UE may separately perform an initial attach process with the 4G network or the 5G network. For example, the initial attach process may be performed sequentially for each network or simultaneously.

Figure 3:
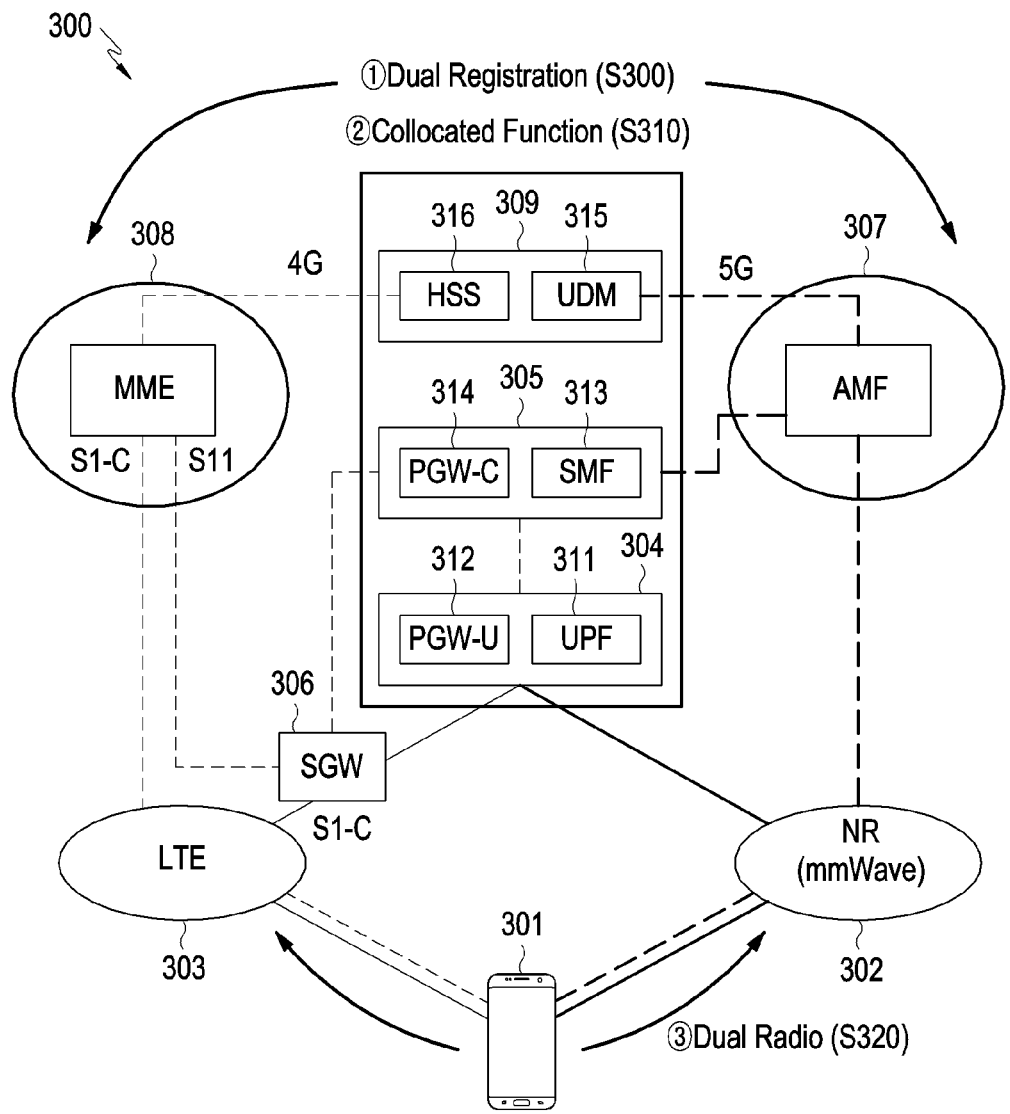
FIG. 3 illustrates an example of an operation of interworking between a 4G network and a 5G network based on dual registration.

FIG. 3 illustrates an example of an operation of interworking between a 4G network and a 5G network based on dual registration, according to the present disclosure.

As shown in FIG. 3, an architecture of a wireless communication system may include a UE, a control plane, and a data plane.

A UE 301 according to the present disclosure may dually access the 4G network and the 5G network in a coexistence environment of the 4G network and the 5G network, in operation S300. For example, the UE may maintain accessing both the 4G network and the 5G network, and reset a data delivery path when moving between the service areas of the 4G network and the 5G network, enabling the UE to use a continuous communication service.

In the control plane according to the present disclosure, 4G and 5G dual registration may be possible and UE contexts for the 4G network and the 5G network may be separated.

The data plane according to the present disclosure may include an integrated 5G/4G function 304.

In FIG. 3, an NR system is illustrated as an example of a 5G system, and an LTE system is illustrated as an example of a 4G system. Referring to FIG. 3, an integrated function may include an integrated function 309 of UDM 315 of the 5G network and HSS 316 of the 4G network, an integrated function 305 of SMF 313 of the 5G network and PGW-C 314 of the 4G network, or an integrated function 304 of UPF 311 of the 5G network and PGW-U 312 of the 4G network.

The data plane may include a general Internet protocol (IP) anchor (the SMF/PGW-C integrated function 305 and the UPF/PGW-U integrated function 304), the UDM/HSS integrated function 309 storing IP anchor information, and AMF 307 or MME 308 that searches the UDM/HSS integrated function 309 for the IP anchor information in handover (HO) registration.

In application of dual registration-based interworking according to the present disclosure, the UE may separately perform an initial attach process with the 4G network or the 5G network. For example, the initial attach process may be performed sequentially for each network or simultaneously. For example, when the UE in a state of being initially attached to the 4G network moves from a service coverage to a 5G network coverage, the UE may perform the initial attach process (when the UE has not performed the attach process before) or a packet data network (PDN) connectivity request process (when the UE has performed the attach process before) with the 5G network.

Figure 4:
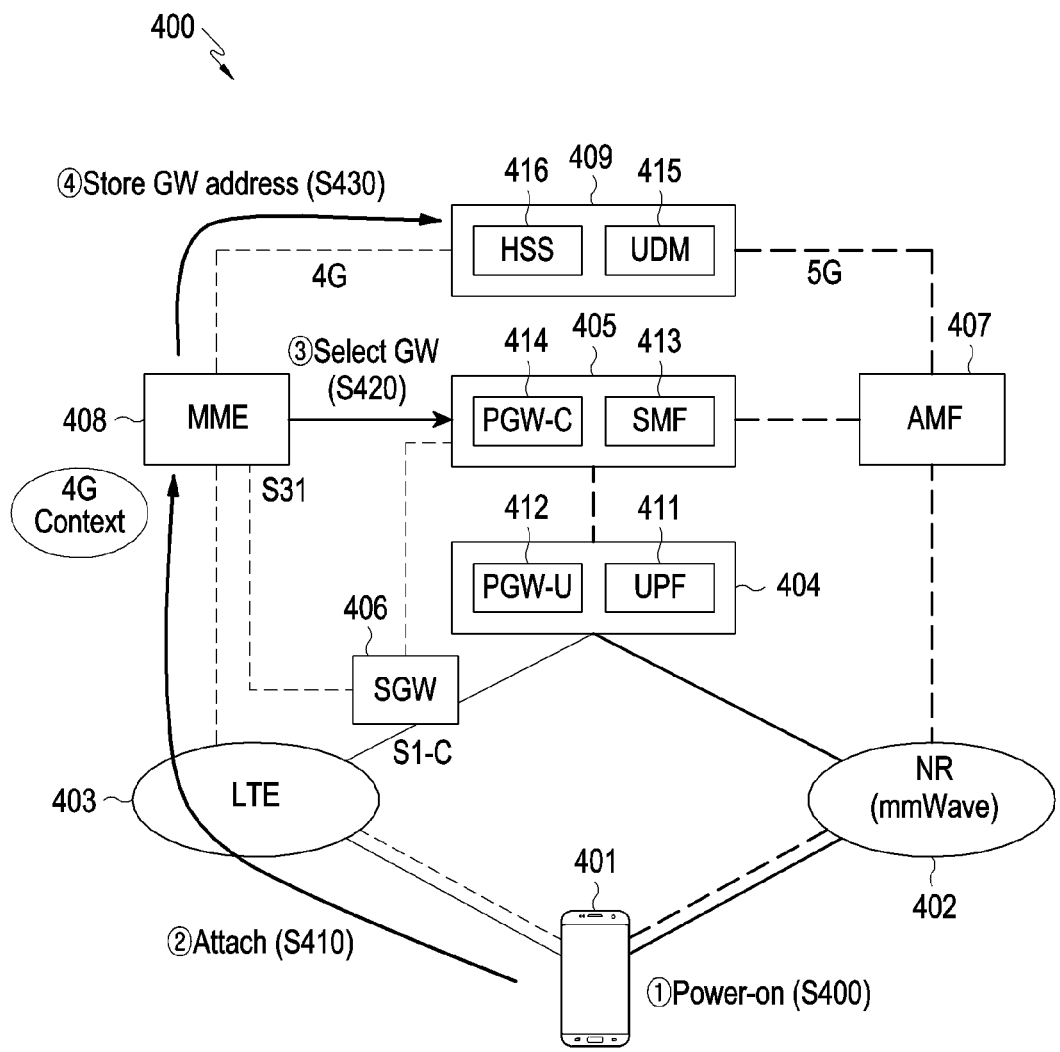
FIGS. 4 and 5 illustrate an example of an operation for a case where a UE registers in a 5G network area in a state of being initially attached to a 4G network.
Figure 5:
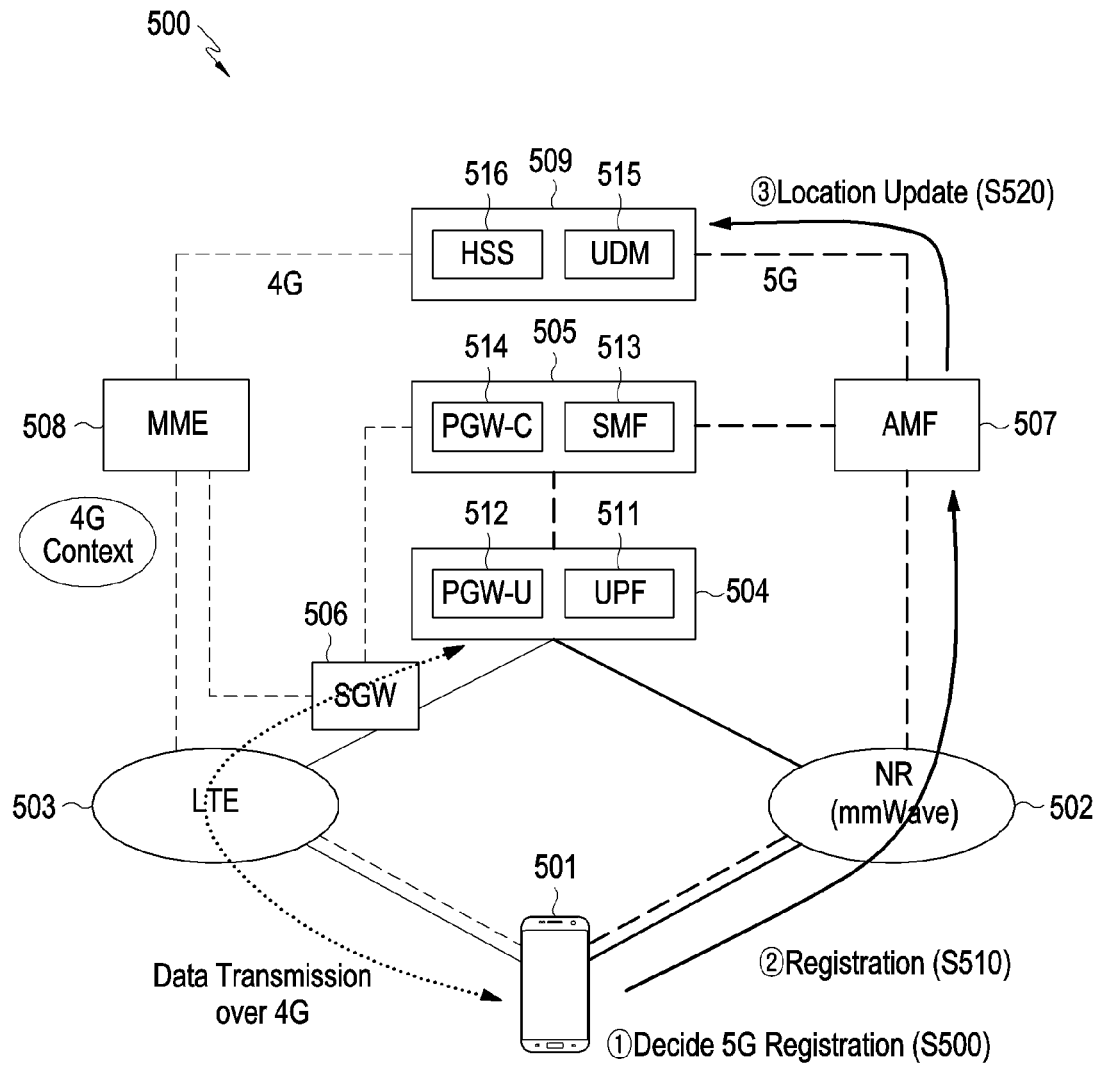

FIGS. 4 and 5 illustrate an example of an operation for a case where in a state of being initially attached to a 4G network, the UE moves from a 4G service area to a 5G service area.

FIG. 4 shows an example of an operation in which the UE performs the initial attach process with the 4G network.

When a UE 401 is powered on, the UE 401 may perform the initial attach process with an evolved packet system (EPS) in operation S400.

The UE 401 may transmit information indicating a "4G/5G non access stratum (NAS) support" capability or a dual registration support" capability to the MME 408 through an attach request message in operation S410.

Upon receipt of "4G/5G NAS Support", the MME 408 may select an interworking GW (e.g., the SMF/PGW-C integrated function 405) for the UE 401 in operation S420. In this case, a bearer setup procedure for a default bearer of the UE 401 may be performed.

The MME 408 may perform a notify process on an HSS/UDM integrated function 409 to store an address or related access point name (APN) information of the SMF/PGW-C in the HSS/UDM integrated function 409 in operation S430.

FIG. 5 illustrates an example of an operation in which a UE having performed initial attachment hands over from the 4G network to the 5G network.

A UE 501 may determine a timing to register in a 5G system, in operation S500. For example, the UE 501 may determine a timing to register in the 5G system by using NR detection, neighbor discovery, threshold comparison, etc.

The UE 501 may transmit a 5G globally unique temporary identifier (GUTI) mapped to 4G ('5G GUTI mapped from 4G'), together with the information indicating the '4G/5G NAS Support' capability or the 'Dual Registration Support' capability, to an AMF 507 through a registration request (Registration REQ) message in operation S510.

The AMF 507 may perform a location update operation with an UDM/HSS 509 in operation S520. A location update message transmitted from the AMF 507 to the UDM/HSS 509 may include "dual attach indication" information. The AMF 507 may retrieve an address of an IP anchor (e.g., SMF) for an APN/data network name (DNN) from the UDM/HSS 509. When receiving 'dual attach indication' information, the UDM/HSS 509 may not transmit a cancel location message to the MME 508.

The AMF 507 may store the retrieved address of the IP anchor (e.g., SMF).

Figure 6:
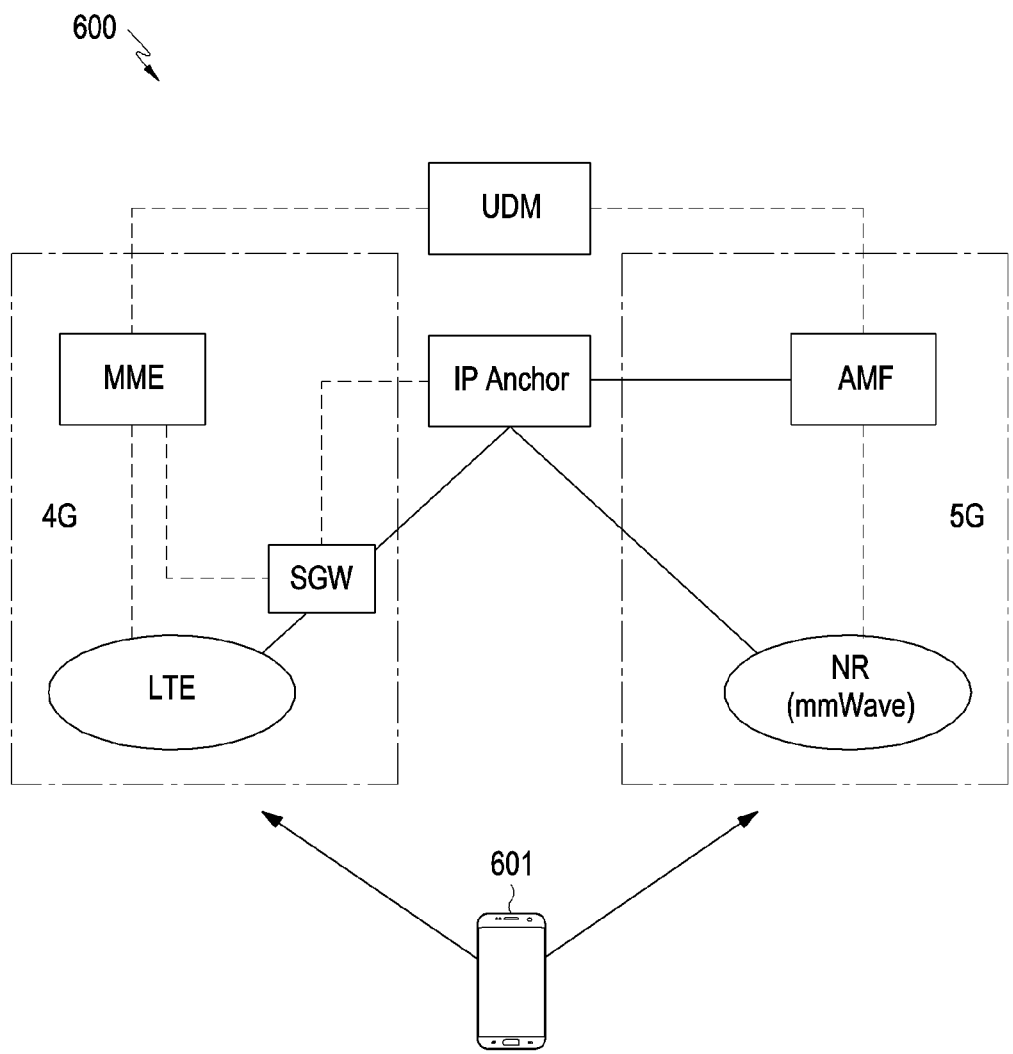
FIG. 6 illustrates a network architecture associated with protocol data unit (PDU) session establishment.

FIG. 6 illustrates a network architecture associated with PDU session establishment.

In a handover operation between BSs, information that sets a data transmission path for data synchronization is delivered in a handover procedure, but for simultaneous registration-based interworking, UE mobility is supported through a process of attachment of a UE 601 to a network without handover signal delivery between the BSs, the handover operation may not be applied. For the 4G network, a transmission path (or tunnel) is configured with data radio bearer units of a wireless section, whereas for the 5G network, the transmission path is configured with QoS flow units that correspond to an IP flow set having the same QoS. Thus, an existing method for setting a transmission path may not be applied.

Thus, the present disclosure proposes a data path setting scheme to support UE's mobility between the 4G network and the 5G network without a packet loss while avoiding using a handover signal procedure when simultaneous registration-based interworking is applied. Consequently, when the UE moves between the 4G network and the 5G network, a service may be provided continuously without a data loss.

Figure 7:
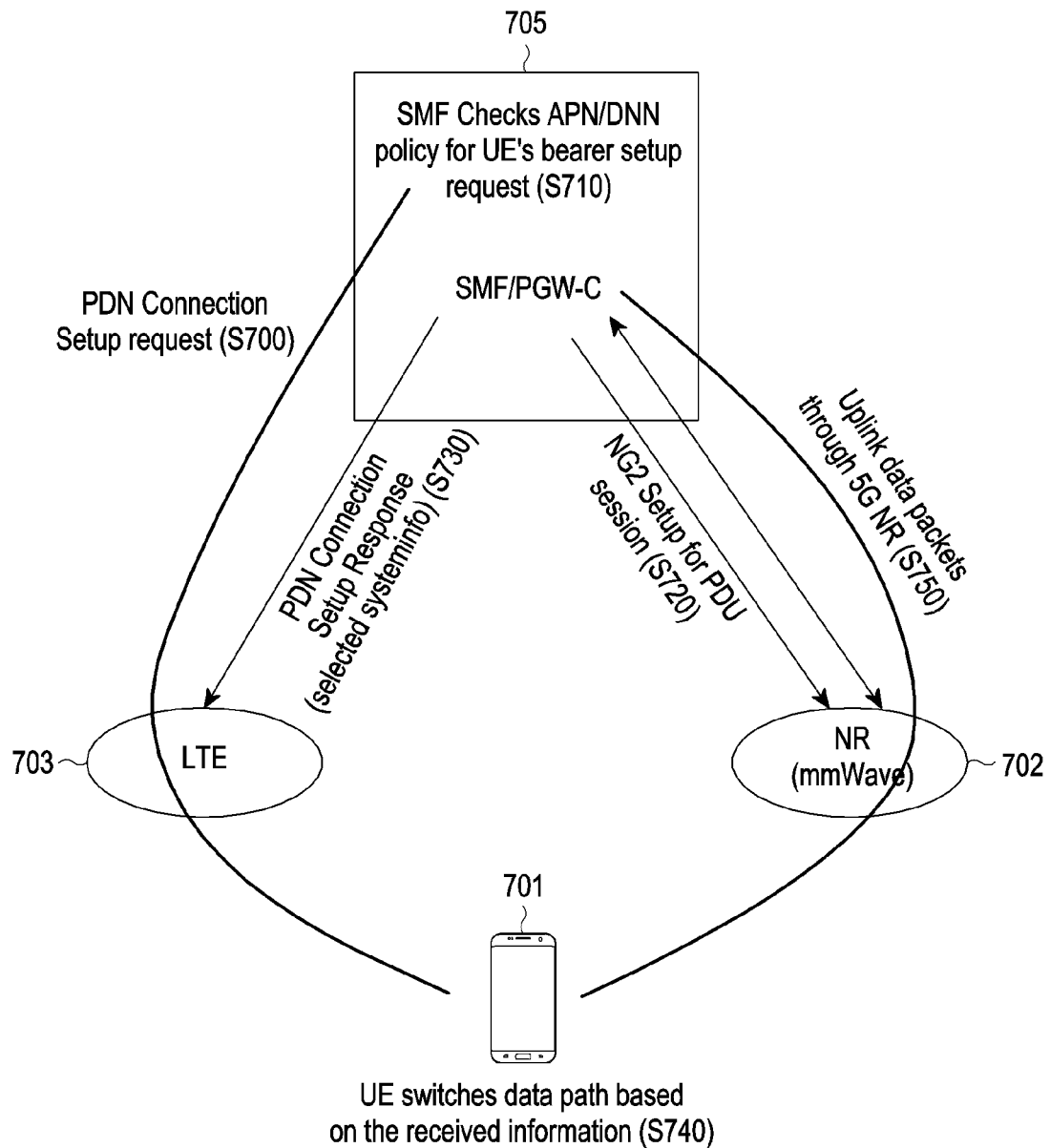
FIG. 7 illustrates an example of a method performed in a network.

FIG. 7 illustrates dual registration-based interworking when a UE moves from a 5G network service area to a 4G network area, according to the present disclosure. A similar operation may also be performed when the UE moves from the 4G network service area to the 5G network area.

In application of dual registration-based interworking in a wireless communication system, a UE 701 may separately perform an initial attach process with a 4G network 703 or a 5G network 702. For example, the initial attach process may be performed sequentially for each network or simultaneously.

When the UE 701 in a state of being initially attached to the 5G network moves from a 5G network area to a 4G network area, the UE 701 may perform the initial attach process (when the UE has not performed the attach process before) or a PDN connectivity request process (when the UE has performed the attach process before) with the 4G network.

In the attach process or a PDN connectivity setting procedure of the UE 701, the MME of the 4G network may obtain an address of the SMF/PGW-C used in the 5G network from the UDM/HSS to set a data transmission path to be used by the UE 701, and perform a process of configuring a default bearer to be used by the UE 701 with the SMF/PGW-C by using the obtained address.

Through the process, even when moving between the 4G network and the 5G network, the UE 701 may set the data path with the same SMF/PGW-C and maintain the IP address of the UE 701 as the same value. In the UE attach process, when the default bearer of the UE 701 is configured, the SMF/PGW-C may switch the data transmission path from a path for delivery to a previous 5G BS to a path or delivery to a new 4G BS.

As shown in FIG. 7, a procedure in which the UE 701 in a state of dually accessing the 4G network and the 5G network transmits a request for a new session or a change of an existing session to a particular network for a user service may include at least one of an operation, performed by the SMF/PGW-C, of identifying a type of a service (or traffic) requested by a user, an operation of selecting a system by applying a criterion set for the network to the identified traffic type, an operation of setting a data transmission path by using the selected system and notifying the UE of the set data transmission path, or an operation, performed by the UE, of transmitting the traffic through the data transmission path.

The UE 701 may transmit a request for new PD connection setup or modification or change of an existing EPS bearer to an SMF/PGW-C 705, in operation S700.

The SMF/PGW-C 705 may determine and select a target communication system in response to a PDN connection setup request or an EPS bearer modify request of operation S700, in operation S710. More specifically, the SMF/PGW-C 705 may determine a target communication system (e.g., a 4G system or a 5G system) for the requested service based on at least one of an operator policy (e.g., an APN/DNN policy) set for the network, a load state of the network, a UE subscriber class, a preferred system, or system information configured for each service.

The SMF/PGW-C 705 may create a corresponding PDU session and start an NG2 (or N2 that is a control plane interface between a core network and a RAN) in operation S720.

The SMF/PGW-C 705 may transmit a session creation response, a PDN connection setup response, or an EPS bearer modify response including information about the selected target communication system for traffic path steering to the UE through an AMF or an MME, in operation S730.

The UE 701 may internally switch the data transmission path based on received data session information regarding the target communication system, in operation S740.

The UE 701 may transmit a data packet through the selected data transmission path, in operation S750. FIG. 7 shows an example in which the 5G system is selected as the transmission path.

As such, a UE to which dual registration-based interworking is applied may be supported with mobility of the UE between 4G network and the 5G network in a packet-lossless manner without using a handover signal procedure. Consequently, when the UE moves between the 4G network and the 5G network, a service may be provided continuously without a data loss.

For an operation of a new function of a wireless communication system according to various embodiments of the present disclosure, new messages and parameters will be defined.

A PDN connectivity confirm message is transmitted from the AMF to the SMF to notify that the UE has switched to a designated data transmission path. The PDN connectivity confirm message may be a PDU session establishment confirm message (see S1323 of FIG. 13). After receipt of a confirm message of transmission path change from the UE, the PDN connectivity confirm message may be transmitted from the AMF to the SMF. The PDN connectivity confirm message may include a radio access network tunnel endpoint identifier (RAN TEID). The RAN TEID includes tunnel endpoint information used for a RAN BS to receive data from the UPF and may be used in a header of a user data packet delivered from the UPF to the 4G or 5G RAN BS.

A PDN connectivity confirm ack message is an acknowledgement message transmitted from the SMF to the AMF in response to the PDN connectivity confirm message. The PDN connectivity confirm ack message may be a PDU session establishment confirm ack message (see S1325 of FIG. 13).

Figure 13:
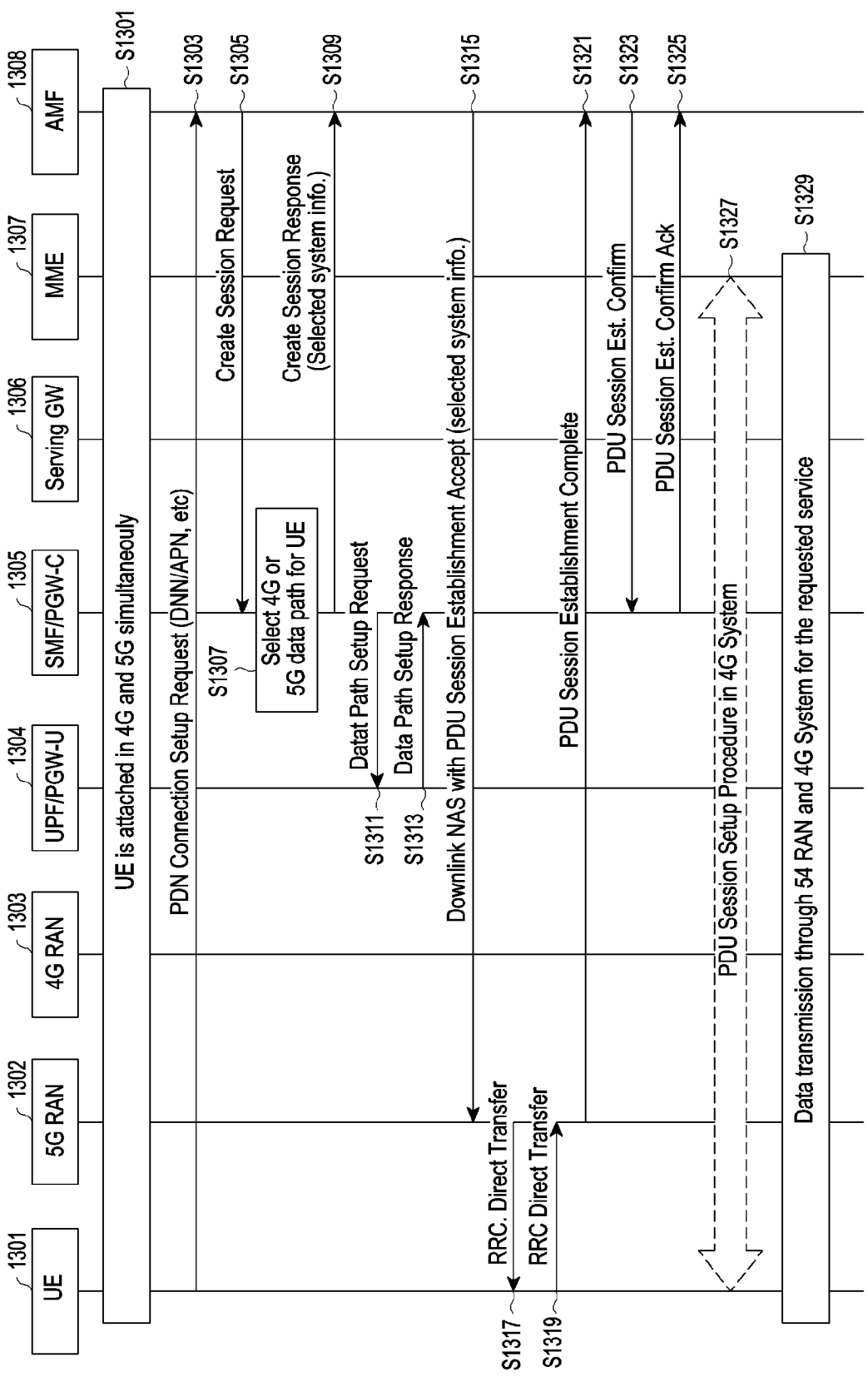
FIG. 13 (FIGS. 11A and 11B) is a signal flow diagram of a procedure in which a dual-registration UE requests session creation or switch through a 5G network and sets a path to a 4G network, according to the present disclosure.

A create session response message is a message for indicating a data transmission path determined in the network for a session requested to be created from the UE and may be transmitted from the SMF to the AMF (see S1309 of FIG. 13). The determined data transmission path may be included as "Selected system info" in the create session response message. That is, the Selected system info may indicate information of the data transmission path determined in the network for the session requested to be created from the UE. By using the Selected system info, a system between the 4G system and the 5G system may be designated to be used.

A data path setup request message is a message for indicating a data transmission path and may be transmitted from the SMF to the UPF (see S1311 of FIG. 13). The data transmission path may be included as a "Selected system info" parameter in the data path setup request message. For example, the Selected system info parameter may be used for the UPF/PGW-U to determine a data path between the 4G BS or the 5G BS. FIG. 11 is a signal flow diagram of a procedure in which a dual-registration UE requests session creation or switch through a 4G network and sets a path to a 5G network, according to the present disclosure.

Figure 11A:
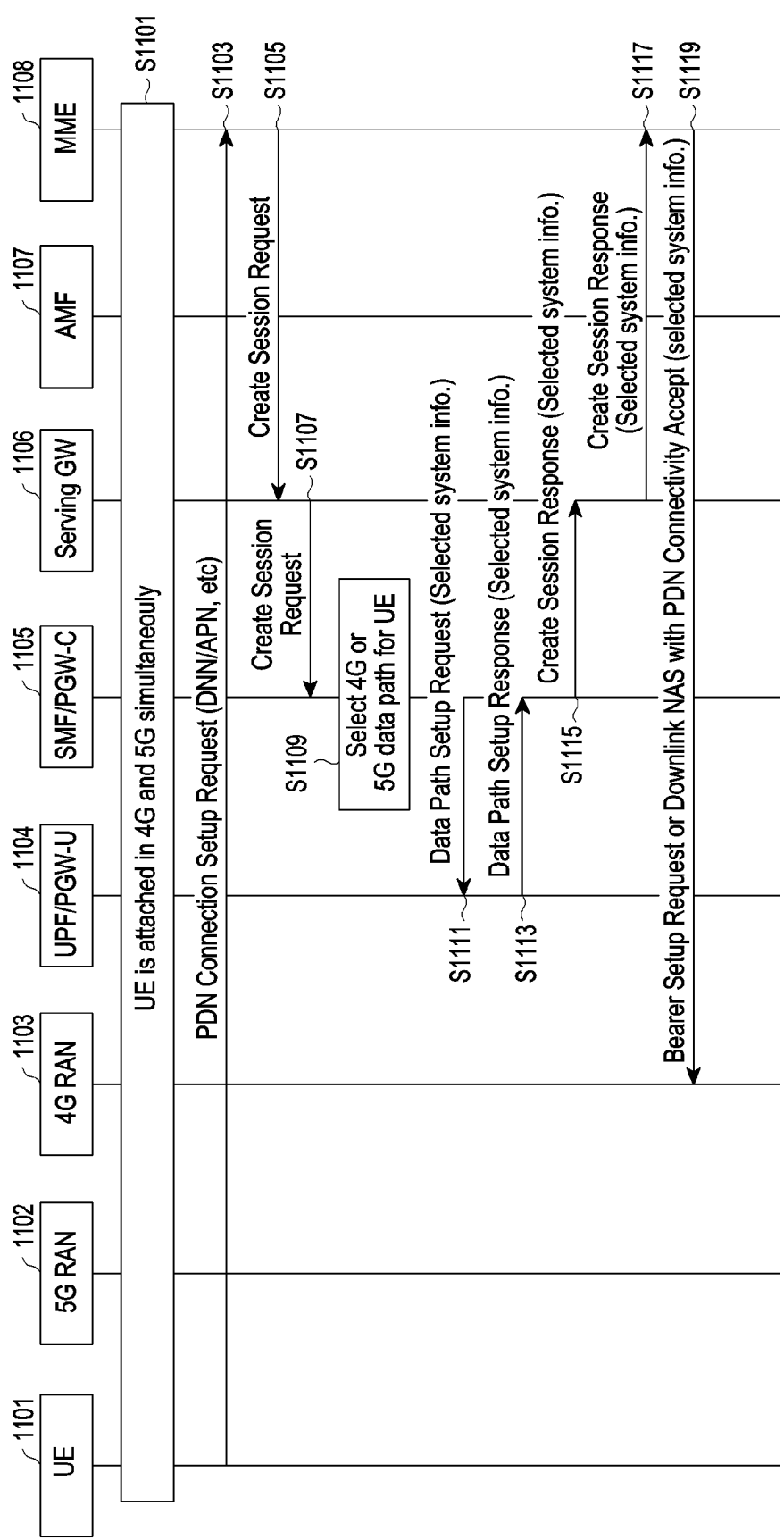
FIG. 11 (FIGS. 11A and 11B) is a signal flow diagram of a procedure in which a dual-registration UE requests session creation or switch through a 4G network and sets a path to a 5G network, according to the present disclosure.
Figure 11B:
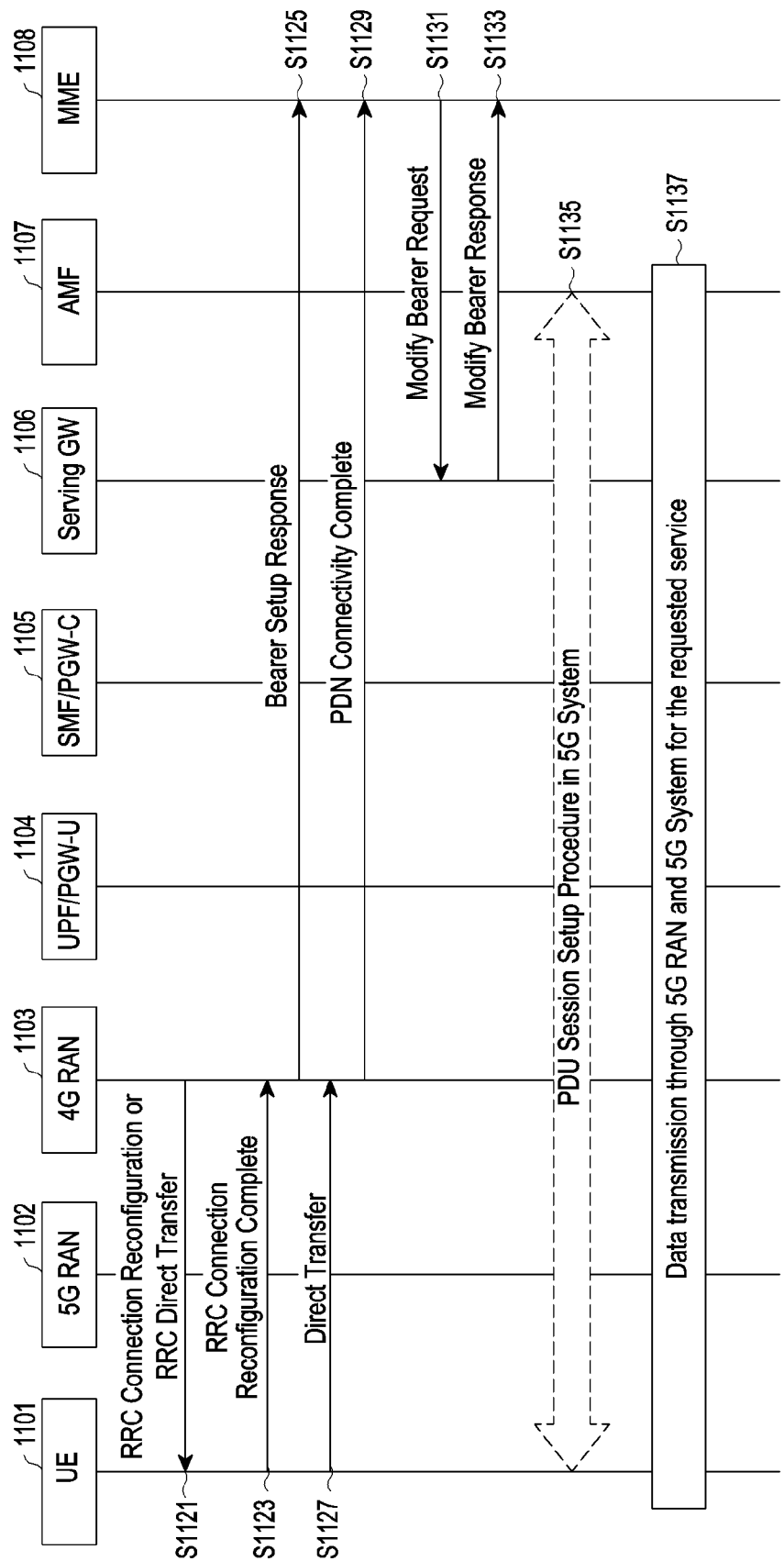

FIGS. 11A and 11B illustrate procedures for setting a data path in response to a session creation or change request of a dually registered UE in a wireless communication system, showing signal flows of an operation in which the UE requests a session through the 4G network and the network sets a path to the 5G network in response to the request.

A UE 1101 is simultaneously attached to a 4G network and a 5G network in a coexistence environment of the 4G network and the 5G network, in operation S1101.

In the 4G network (4G RAN and 4G core network), the UE 1101 may transmit a create request message (e.g., a PDN connection setup request) for setting a new session for a user service to an MME 1108, in operation S1103. To specify information about the user service, DNN/APN information designated for the user service may be included in the request message. The UE 1101 may transmit a modify request message (e.g., a PDN connection modification request) message, instead of the "PDN connection setup request" message, to request a change of an existing session for the user service.

The MME 1108 may deliver a session create (or change) request of the UE 1101 to a serving GW (SGW) 1106 of the 4G network, in operation S1105.

The serving GW 1106 may deliver a session create (or change) request of the UE 1101 to an SMF/PGW-C 1105, in operation S1107.

An SMF/PGW-C 1105 may determine a data transmission path (the 4G system or the 5G system) for a service requested by the UE, based on an operator policy set for the network, load states of the 4G network and the 5G network, a UE subscriber class, a preferred system, reference system information configured for each service (traffic), etc., in operation S1109. In FIG. 11, a description will be made assuming that the 5G system is selected as the data transmission path.

The SMF/PGW-C 1105 may transmit a data path setup request message including information about the determined data path (selected system info) to a UPF 1104 to establish a data path to a system determined to be used for a corresponding session, in operation S1111.

The UPF 1104 may transmit a data path setup response message acknowledging that the data path has been established to the SMF/PGW-C 1105, in operation S1113. The data path setup response message may include information about the determined data path (selected system info).

The SMF/PGW-C 1105 may transmit a response message (e.g., create session response) including 4G or 5G system information corresponding to the determined data transmission path in the selected system info parameter to the serving GW 1106, in operation S1115.

The serving GW 1106 may transmit the message (e.g., create session response) received from the SMF 1105 to the MME 1108, in operation S1117.

The MME 1108 may transmit a PDN connectivity accept message through the selected system info parameter received from the SMF/PGW-C 1105 to a 4G RAN 1103 (e.g., the 4G BS), in operation S1119.

The 4G RAN 1103 may transmit the PDN connectivity accept message received from the MME 1108 through an RRC direct transfer message (or RRC connection reconfiguration message) to the UE 1101, in operation S1121.

To change an existing PDN session, the UE 1101 may transmit an RRC connection reconfiguration complete message to the 4G RAN to respond to RAN information, in operation S1123. However, when the path is changed to the 5G system, transmission of the RRC connection reconfiguration complete message may be omitted.

To change the PDN session of the existing 4G system, the 4G RAN 1103 may transmit a message indicating that path information update is needed (e.g., bearer setup response) to the MME 1108, in operation S1125. However, when the path is changed to the 5G system, transmission of the message indicating that path information update is needed may be omitted.

The UE 1101 may transmit the PDN connectivity complete message to the 4G RAN 1103 through the RRC direct transfer message to the 4G RAN 1103, in operation S1127. The UE 1101 may interpret the data path information determined for the session requested by the UE from the PDN connectivity complete message included in the RRC direct transfer message and update path setup in the UE for traffic of a service based on the data path information.

The 4G RAN 1103 may transmit the PDN connectivity complete message received from the UE 1101 to the MME 1108 in operation S1129. The MME 1108 may determine from the PDN connectivity complete message received from the UE 1101 that data path setup for the session has been successfully completed.

The MME 1108 may transmit a modify bearer request message to the serving GW 1106 in operation S1131. Transmission of the modify bearer request message may be omitted. For example, without transmission of the create session response message in operation S1117, the modify bearer request message may not be transmitted.

When there are preset contents for the session, the serving GW 1106 may delete the preset contents and transmit a response message (e.g., a modify bearer response) to the MME 1108, in operation S1133.

The UE 1101 may transmit the PDN connectivity complete message to the network (4G RAN) in operation S1127, and then perform a session establishment procedure for the session through the 5G network in operation S1135.

The UE 1101 may transmit data packets of a service through the path for the session for which the path setup procedure has been completed, in operation S1137.

FIG. 13 is a signal flow diagram of a procedure in which a dual-registration UE requests session creation or switch through a 5G network and sets a path to a 4G network, according to the present disclosure.

FIG. 13 illustrates a procedure for setting a data path in response to a session creation or change request of a dually registered UE in a wireless communication system, showing a signal flow of an operation in which the UE requests a session through the 5G network and a path is set to the 4G network in response to the request.

A UE 1301 is simultaneously attached to a 4G network and a 5G network in a coexistence environment of the 4G network and the 5G network, in operation S1301.

In the 5G network (5G RAN and 5G core network), the UE 1301 may transmit a request message (e.g., a PDN connection setup request) for setting a new session for a user service to an AMF 1308, in operation S1303. To specify information about the user service, DNN/APN information designated for the user service may be included in the request message. The UE 1301 may transmit a modify request message (e.g., a PDN connection modification request) message, instead of the "PDN connection setup request" message, to request a change of an existing session for the user service.

The AMF 1308 may deliver a session create (or change) request of the UE 1301 to an SMF/PGW-C 1305, in operation S1305.

An SMF/PGW-C 1305 may determine a data transmission path (the 4G system or the 5G system) for a service requested by the UE, based on an operator policy set for the network, load states of the 4G network and the 5G network, a UE subscriber class, a preferred system, reference system information configured for each service, etc., in operation S1307. In FIG. 13, a description will be made assuming that the 4G system is selected as the data transmission path.

The SMF 1305 may transmit a response message (e.g., create session response) including 4G or 5G system information corresponding to the determined data transmission path in the selected system info parameter to the AMF 1308, in operation S1309.

The SMF 1305 may transmit a data path setup request message including information about the determined data path to a UPF 1304 to establish a data path to a system determined to be used for a corresponding session, in operation S1311.

The UPF 1304 may deliver a message acknowledging that a data path to the SMF 1305 has been set (e.g., a data path setup request), in operation S1313.

The AMF 1308 may transmit the selected system info parameter received from the SMF 1305 through a PDU session establishment accept message to the 5G RAN 1302 (e.g., the NR BS or the gNB), in operation S1315.

The 5G RAN 1302 may transmit the PDN session establishment accept message received from the AMF 1308 through an RRC direct transfer message to the UE 1301, in operation S1317.

The UE 1301 may obtain the data path information determined for the session requested by the UE 1301 from the PDN session establishment accept message included in the RRC direct transfer message and update path setup in the UE for traffic of a service based on the data path information. The UE 1301 may transmit the PDN session establishment complete message through the RRC direct transfer message, in operation S1319.

The 5G RAN 1302 may transmit the PDN session establishment complete message received from the UE 1301 to the AMF 1308 in operation S1321.

The AMF 1308 may transmit a PDN session establishment complete message received from the UE 1301 through a PDU session establishment confirm message to the SMF 1305, in operation S1323.

The SMF 1305 may receive a PDU session establishment confirm ack message from the AM 1308 and determine that path setup has been successfully performed, in operation S1325. The SMF 1305 may perform a data path update procedure with the 4G RAN through the MME 1307. The path update procedure of the SMF 1305 may be performed immediately after operation S1311.

For the session between the UE 1301 and the MME 1307, the session establishment procedure through the 4G network may be performed in operation S1327. The session establishment procedure S1327 may be performed immediately after transmission of the RRC direct transfer message of operation S1319.

The UE 1301 may transmit data packets of a service through a newly designated data path for the session for which the path setup procedure has been completed, in operation S1329.

Figure 8A:
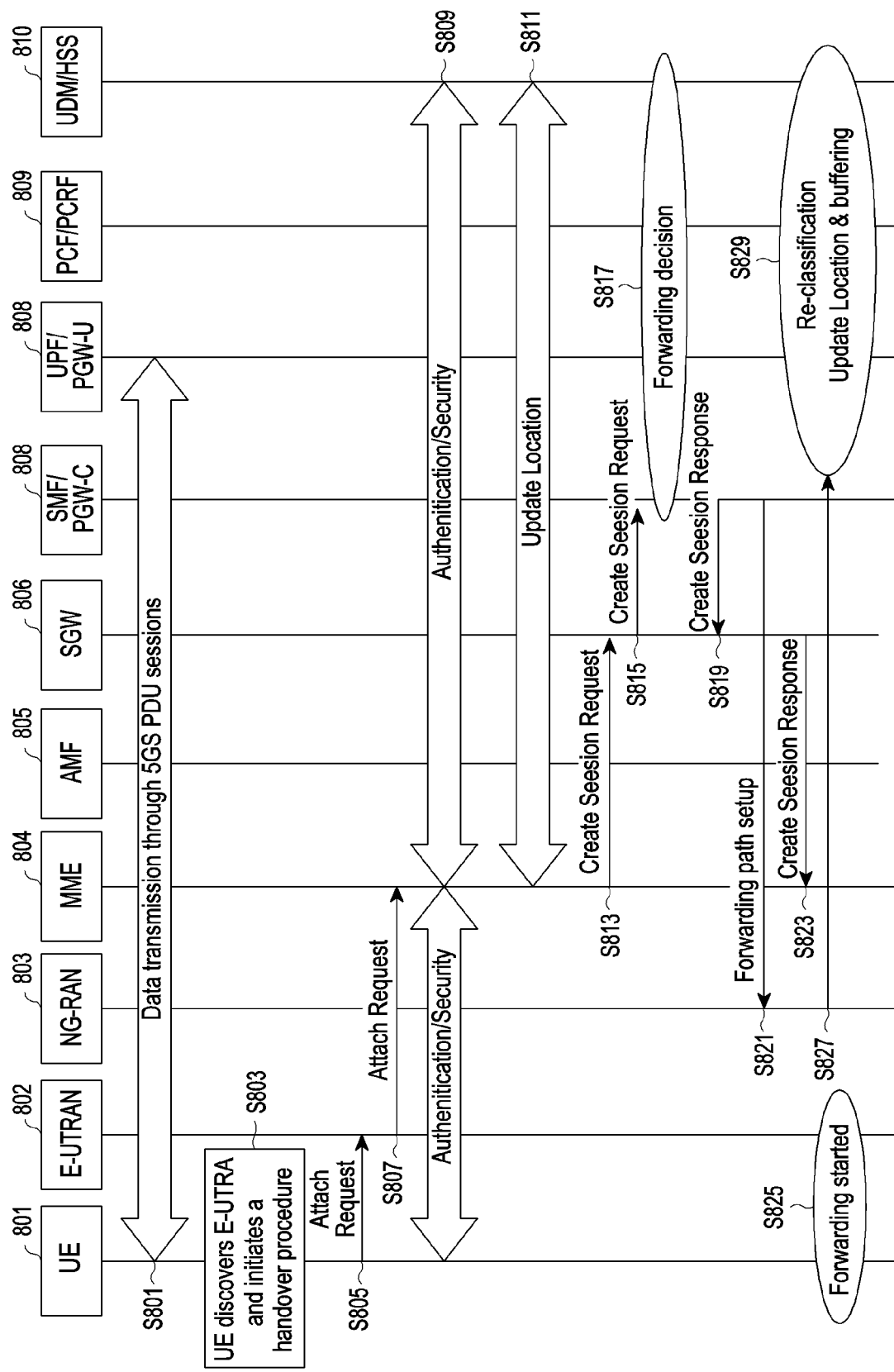
FIG. 8 (FIGS. 8A and 8B) illustrates a procedure associated with network control session steering in a wireless communication system.
Figure 8B:
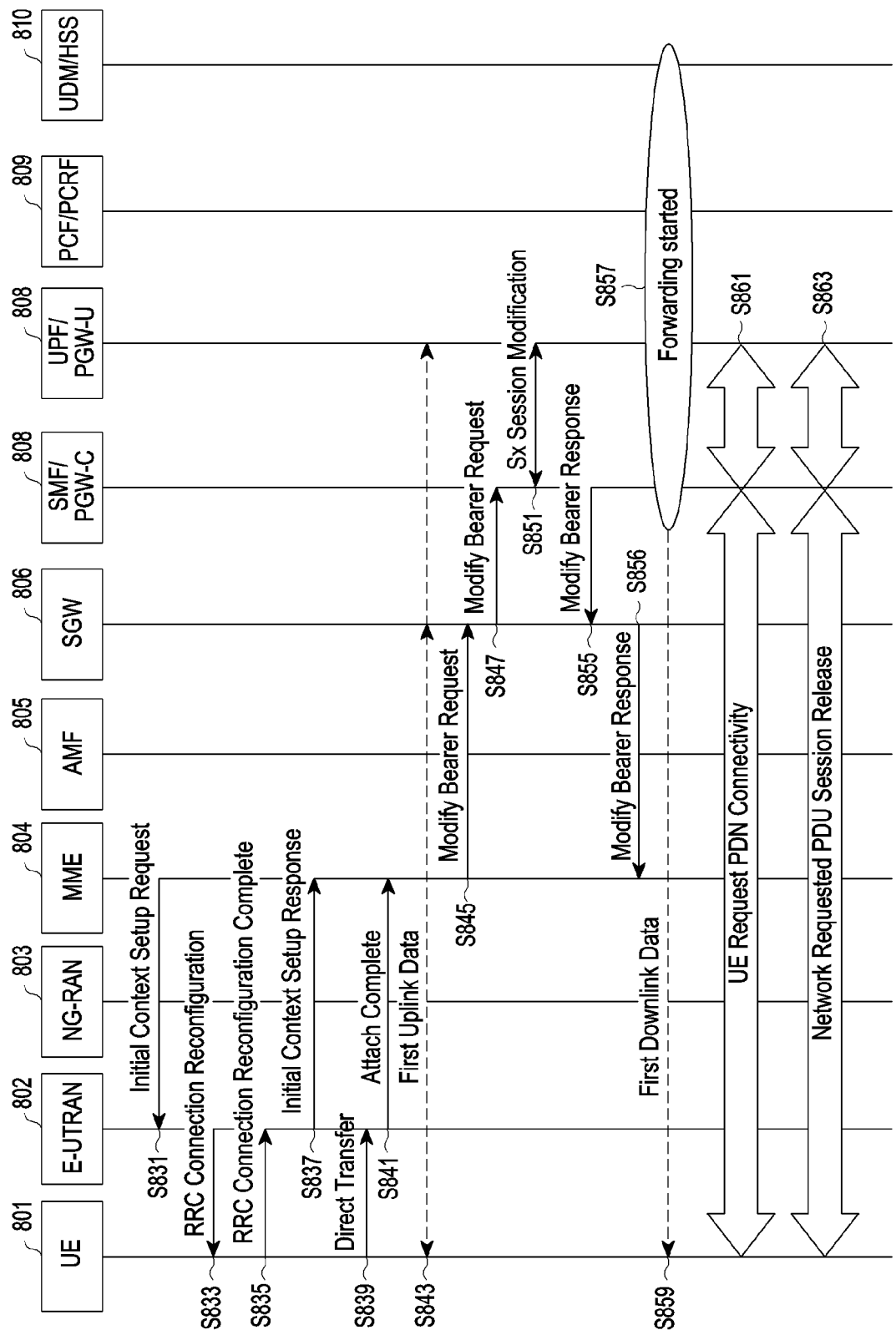

FIGS. 8A and 8B illustrate a session steering related procedure controlled by a network, according to the present disclosure. A method for switching a traffic path, illustrated in FIGS. 8A and 8B, is also applicable to network-triggered traffic path switching. FIGS. 8A and 8B show signal flow diagrams assuming that the UE hands over from 5G to 4G.

A UE 801 has set a PDU session through the 5G system and is in communication, in operation S801.

The UE 801 may determine a timing for registration in the 4G system (e.g., an evolved universal terrestrial radio access (E-UTRA) system). For example, when discovering the 4G system, the UE 801 may start a handover to the 4G system in operation S803.

For initial registration, the UE 801 may transmit "GUIT mapped from 5G", together with information indicating a 'dual registration support' capability, through an attach REQ message to the MME 804, in operations S805 and S807. Upon receiving 'dual attach support', the MME 804 may register a location of the UE in a UDM/HSS 810, and retrieve an address of an IP anchor (e.g., an SMF) for an APN/DNN (set by the 5G system) from the UDM/HSS 810. The UDM/HSS 810 may not transmit a cancel location message to an AMF 805. Each time when new PDN connection is added, the MME 804 may store the address of the IP anchor, together with an APN of new PDN connection, in the UDM/HSS 810.

The UE 801 may transmit a PDU session establishment request (e.g., a create session request) to an SM 808 in operations S813 and S815.

The SMF 808 may determine a data path to be used (4G or 5G, herein, 4G) in operation S817.

The SMF 808 may transmit an indication for a selected data path through a PDU session establishment response (e.g., a create session response) to the UE 801 (e.g., in operations S819, S823, S831, and S833). Examples of the 'indication' included in the PDU session establishment response may include an option for triggering (e.g., piggybacking a target communication system QoS parameter) to use another system while transmitting a 'success' code, an option for triggering data path re-setup (or handover) to another system while transmitting the 'success' code, or an option for the UE to re-select or hand over to another system while transmitting an 'error' code.

The UE 801 receiving the indication may switch the data path to another system (e.g., in at least one of operations S835, S837, S839, S841, S845, S847, S855, or S856).

Figure 9A:
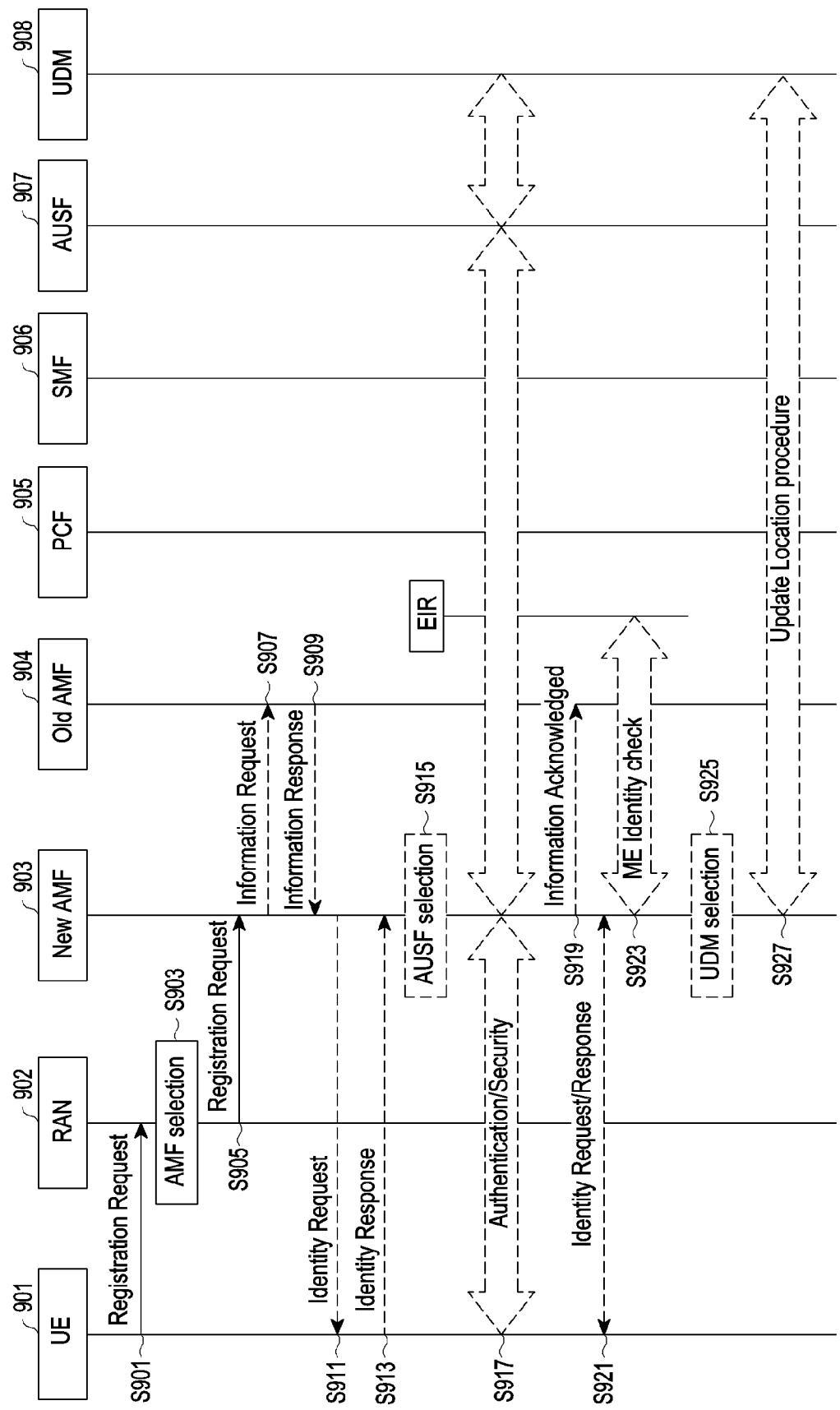
FIG. 9 (FIGS. 9A and 9B) illustrates a registration procedure in a handover from 4G to 5G in a wireless communication system.
Figure 9B:
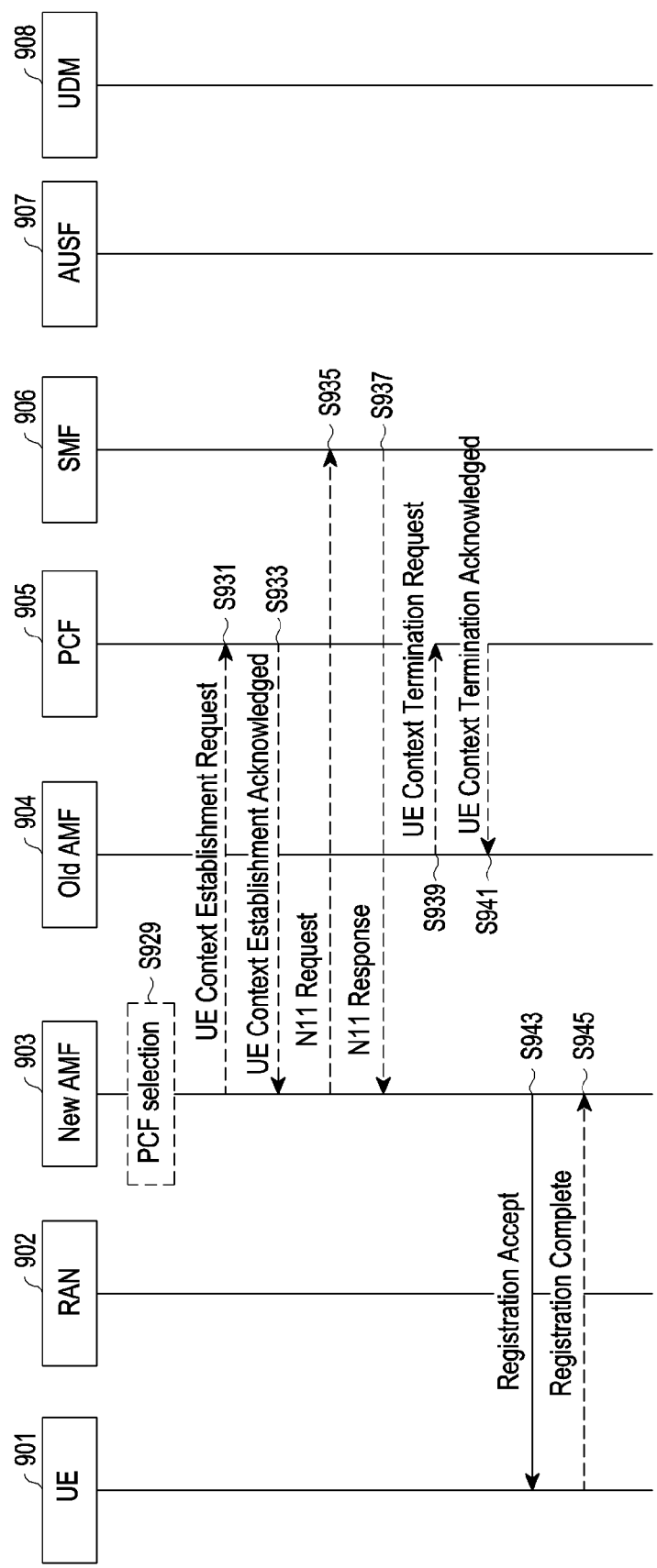

FIGS. 9A and 9B illustrate signal flows related to a registration procedure in a handover from 4G to 5G in a wireless communication system, according to the present disclosure. FIG. 9 expresses the initial attach process and the handover operation illustrated in FIGS. 4 and 5 as signal flows.

A UE 901 being attached to the 4G system may determine a timing to register in the 5G system and transmit a registration request message to a RAN 902, in operation S901. The UE 901 may transmit "5G GUTI mapped from 4G", together with information indicating a '4G/5G/NAS support, dual registration support' capability, through the registration request message to an AMF 903.

Selectively, the AMF 903 may perform an authentication/security procedure with an authentication server function (AUSF) 907, in operation S917.

Selectively, the AMF 903 may check an identity of the UE 901 by using equipment identity register (EIR), in operation S923.

Selectively, the AMF 903 may perform location update (including 'dual attach indication') by using the UDM/HSS in operation S927, and search for the address of the IP anchor (e.g., SMF) of the APN/DNN (EPS stored by a source system). Upon receiving the 'dual attach indication', the UDM/HSS may not transmit the cancel location message to the MME. (for reference, for a non-3GPP system, when a 'handover indication' is received, the cancel location message may be transmitted by the HSS.)

Selectively, the AMF 903 may store the address of the IP anchor (e.g., SMF).

The UE 901 may receive a registration accept message with respect to the registration request message from the AMF 903, in operation S943.

Figure 10A:
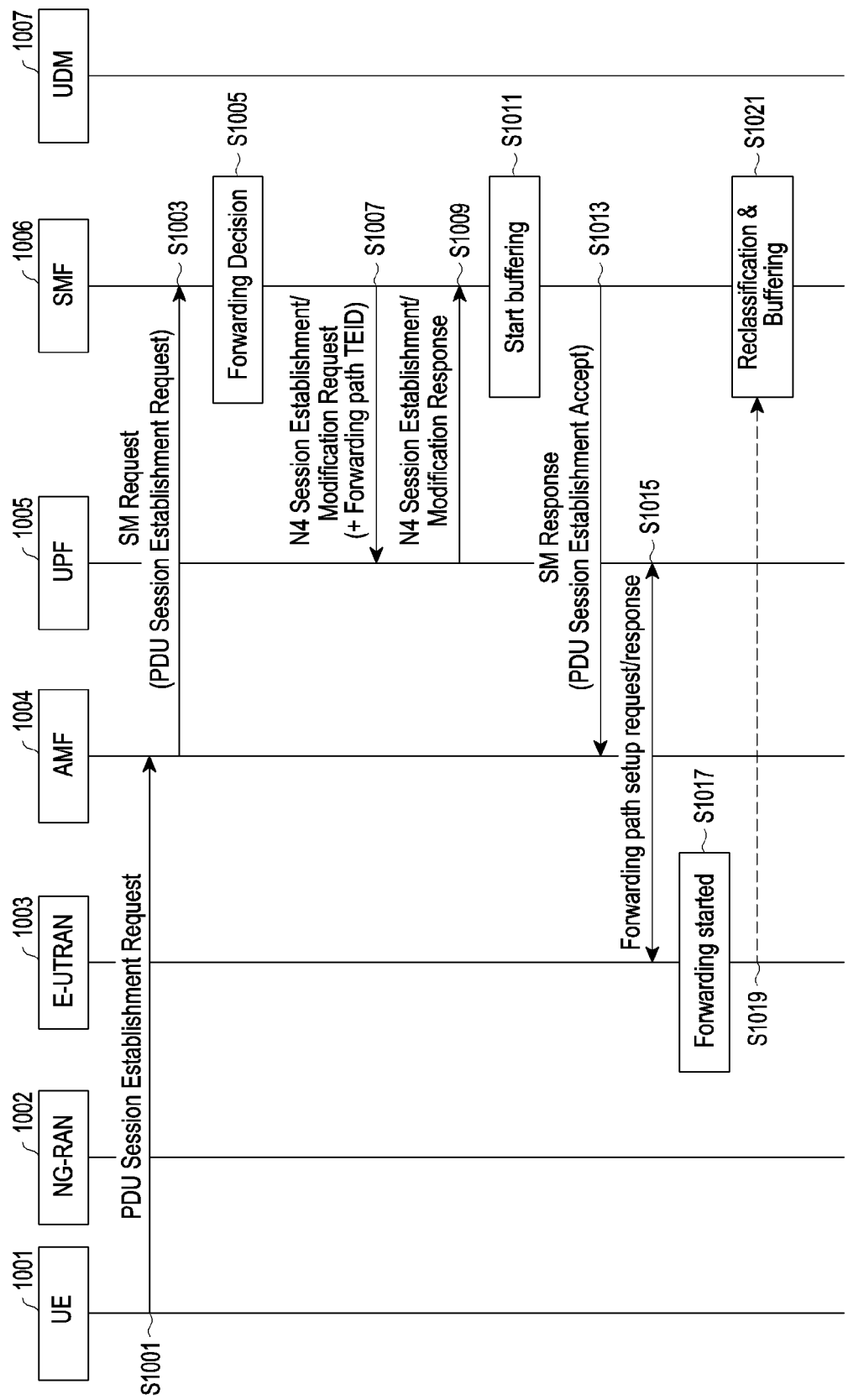
FIG. 10 (FIGS. 10A and 10B) illustrates a procedure associated with PDU session establishment in a handover from 4G to 5G in a wireless communication system.
Figure 10B:
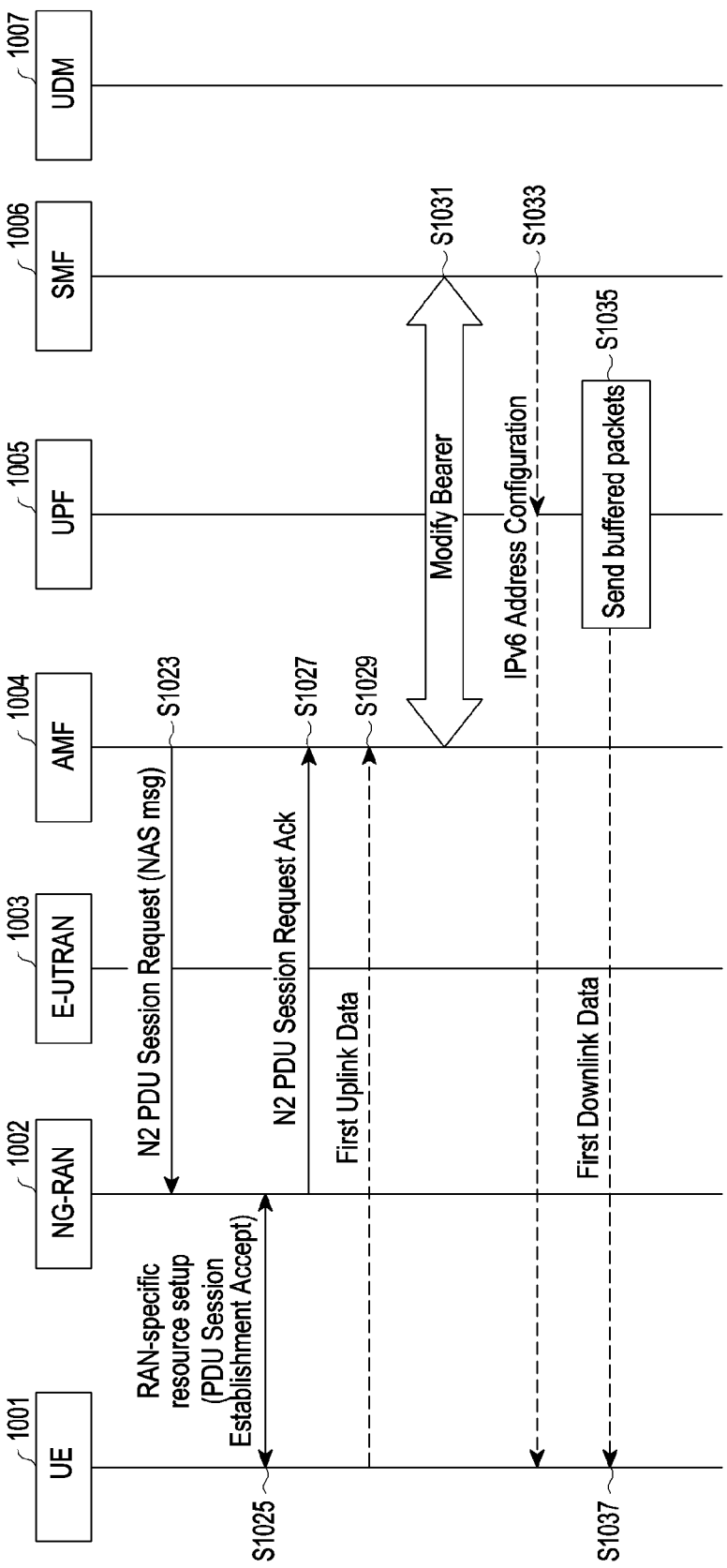

FIGS. 10A and 10B illustrate signal flow diagrams showing a procedure related with PDU session establishment in a handover from 4G to 5G in a wireless communication system, according to the present disclosure.

A UE 1001 may transmit a PDU session establishment request having a registration type 'existing PDU session' to an AMF 1004, in operation S1001.

The AMF 1004 may deliver the received PDU session establishment request to an SMF 1006, in operation S1003.

Each time when a new PDU session is added, the AMF 1004 may store an address of the SMF 1006, together with a DNN related with the new PDU session, in an UDM/HSS 1007.

Figure 12A:
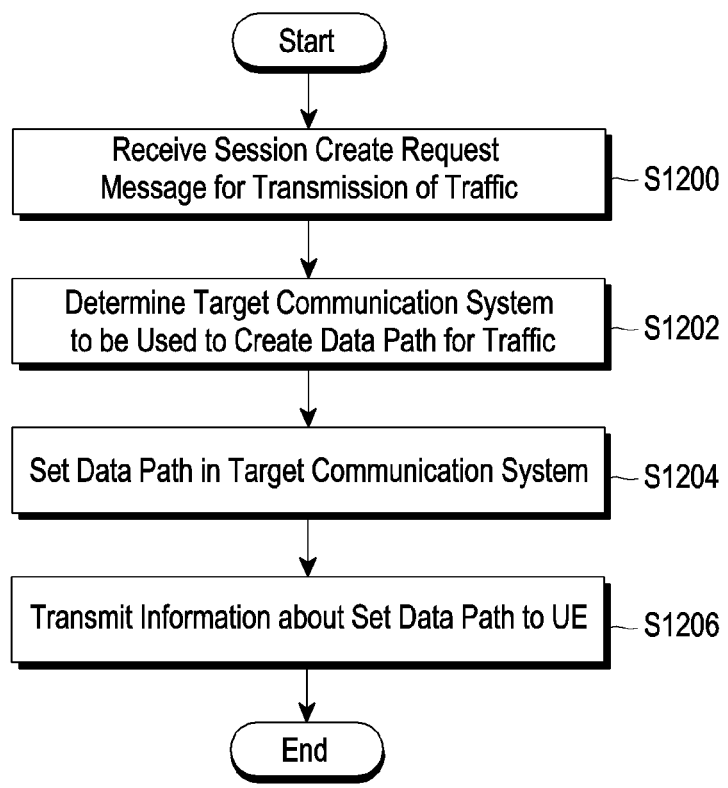
FIG. 12A is a flowchart of a method of a network function that supports communication of a dual-connectivity UE, according to the present disclosure.

FIG. 12A is a flowchart of a method of a network function that supports communication of a dual-connectivity UE, according to the present disclosure.

A network function may receive a session create request message for traffic transmission from a UE, in operation S1200. The network function may be, for example, one of an SMF of the 5G communication system, a PGW-C of the 4G communication system, or an SMG/PGW-C collocated function. The data session create request message may be received from the UE through any one of an MME of the 4G communication system or an AMF of the 5G communication system.

The network function may determine a target communication system to be used to create a data path for the traffic between a first RAT communication system and a second RAT communication system, in operation S1202. The target communication system may be determined between the first RAT communication system and the second RAT communication system, based on a type of the traffic. The target communication system may be determined based on any one of an operator policy, a load status, a UE subscriber class, or system information preferred for the traffic, which is set in the first RAT communication system and the second RAT communication system.

The network function may set the data path in the target communication system, in operation S1204. More specifically, the network function may transmit a data path setup request message to the UPF or the PGW-U of the target communication system.

The network function may transmit information about the set data path to the UE, in operation S1206.

Selectively, the network function may transmit a response message with respect to the data session create request message to any one of an MIME of the 4G communication system or an AMF of the 5G communication system. The response message may include information about the target communication system.

Figure 12B:
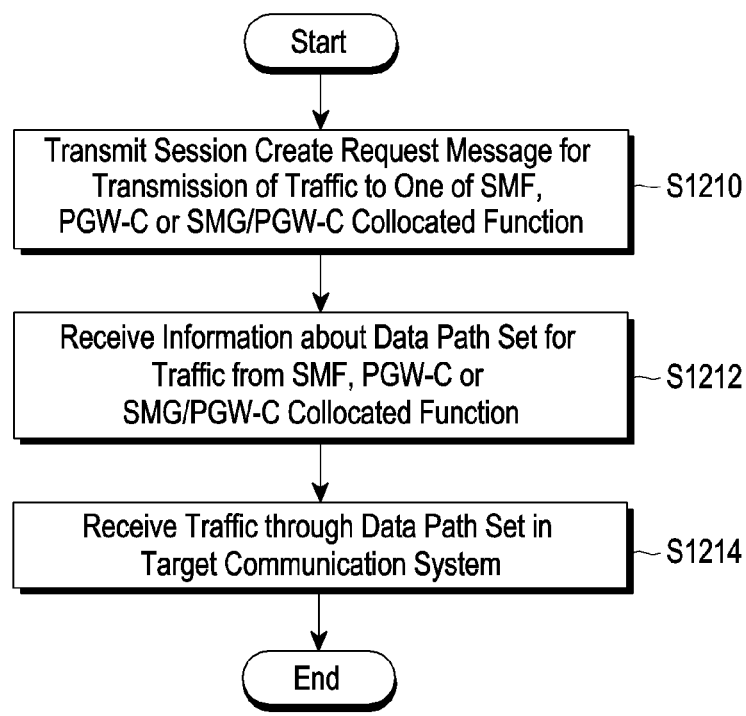
FIG. 12B is a flowchart of a communication method of a dual-connectivity UE, according to the present disclosure.

FIG. 12B is a flowchart of a communication method of a dual-connectivity UE, according to the present disclosure.

The UE may transmit the session create request message for traffic transmission to any one of an SMF of the 5G communication system, a PGW-C of the 4G communication system, or an SMG/PGW-C collocated function, in operation S1210.

The UE may receive information about the data path set for the traffic from one of the SMF, the PGW-C, or the SMG/PGW-C collocated function, in operation S1212.

The UE may receive the traffic from one of the first RAT communication system and the second RAT communication system through the set data path, in operation S1214.

Figure 14:
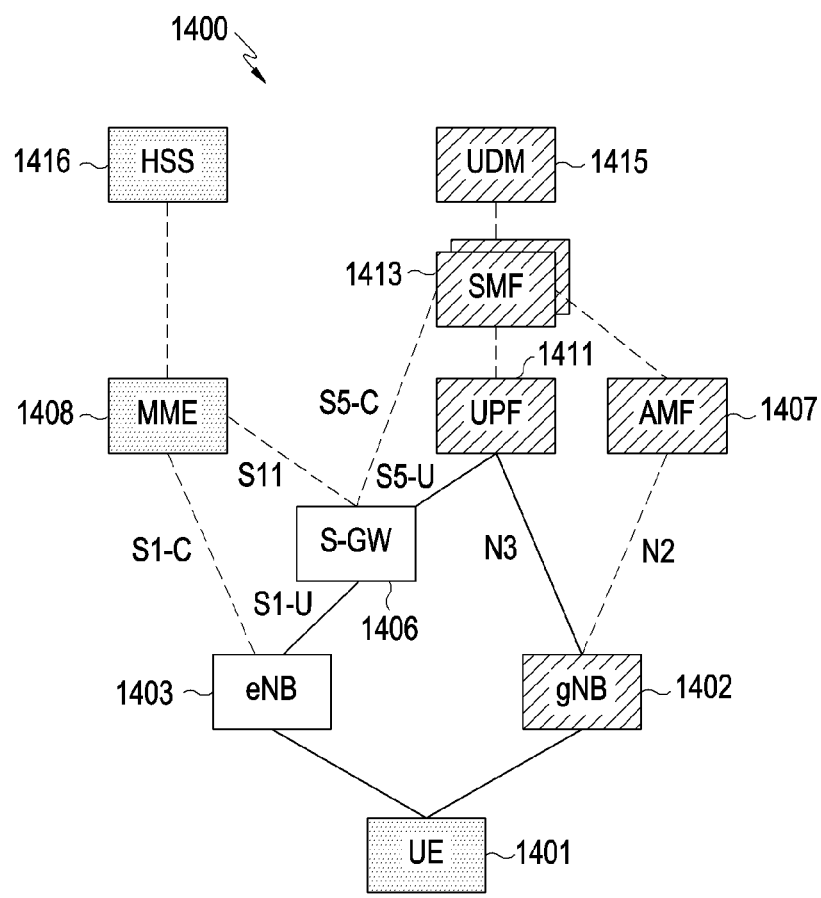
FIG. 14 is a conceptual diagram associated with a dynamic packet data network gateway (PGW)/session management function (SMF) allocation.
Figure 15:
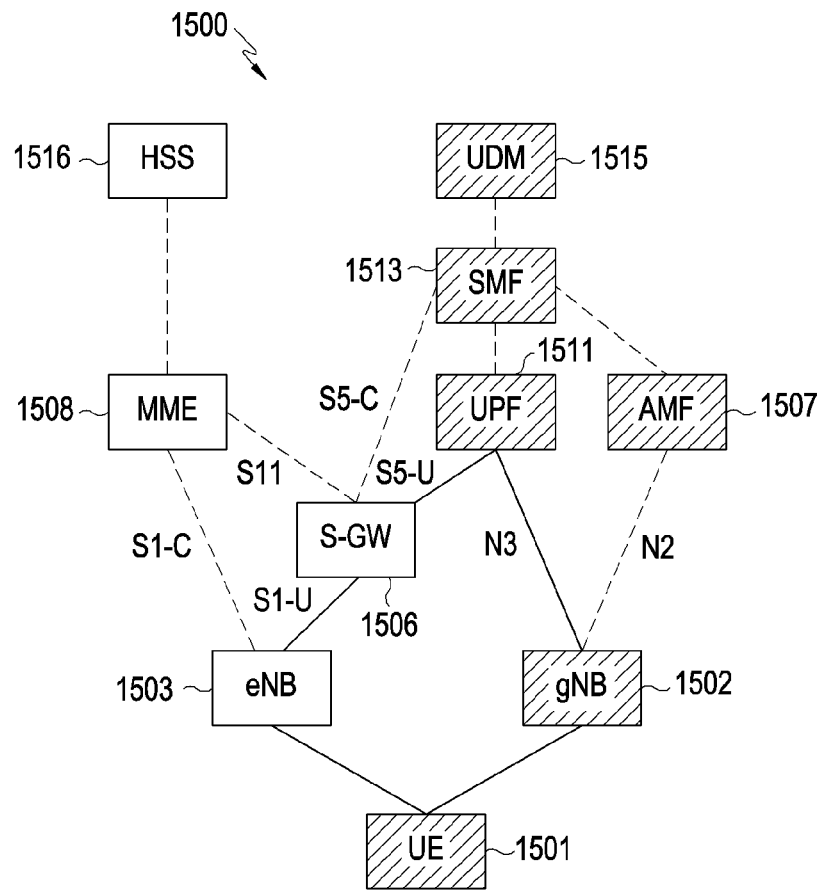
FIG. 15 is a conceptual diagram associated with a manual PGW/SMF configuration.

FIGS. 14 and 15 are conceptual diagrams of requirements for application of a 4G-5G interworking method according to the present disclosure to a legacy network.

FIG. 14 illustrates requirements for a legacy system (e.g., the 4G system) in application of dynamic PGW/SMF allocation.

As shown in FIG. 14, when a scheme for supporting a method according to the present disclosure is applied to functions of a 5G network, that is, a UDM 1415, an SMF 1413, a UPF 1411, an AMF 1407, and an NR BS (gNB) 1402, an HSS 1416 and an MME 1408 of the 4G system may require upgrade of software (SW).

More specifically, the UE 1401 and the MME 1408 may be upgraded in terms of SW to support an NAS message modified in the present disclosure, and the HSS 1416 may be upgraded in terms of SW not to transmit a cancel location message to the MME 1408 upon receipt of a "dual attach indication". The S-GW 1406 and the eNB 1403 may not be required to be changed.

FIG. 15 illustrates requirements in application of manual PGW/SMF configuration.

A scheme for supporting a method according to the present disclosure is applied to functions of a 5G network, i.e., a UDM 1515, an SMF 1513, an UPF 1511, an AMF 1507, and an NR BS (gNB) 1502, and when dynamic PGW/SMF allocation of FIG. 14 is impossible, the method according to the present disclosure may be applied without changing the legacy network as shown in FIG. 15.

More specifically, a UE 1501 may not support an NAS message modified in the present disclosure, or an MME 1508 may ignore a new parameter added in the present disclosure. In a 5G UE profile, an HSS/UDM may include a basic address of the PGW/SMF 1513 of the APN enabling 4G-5G interworking provided to the MME or SMF for PGW/UPF selection.

Figure 16:
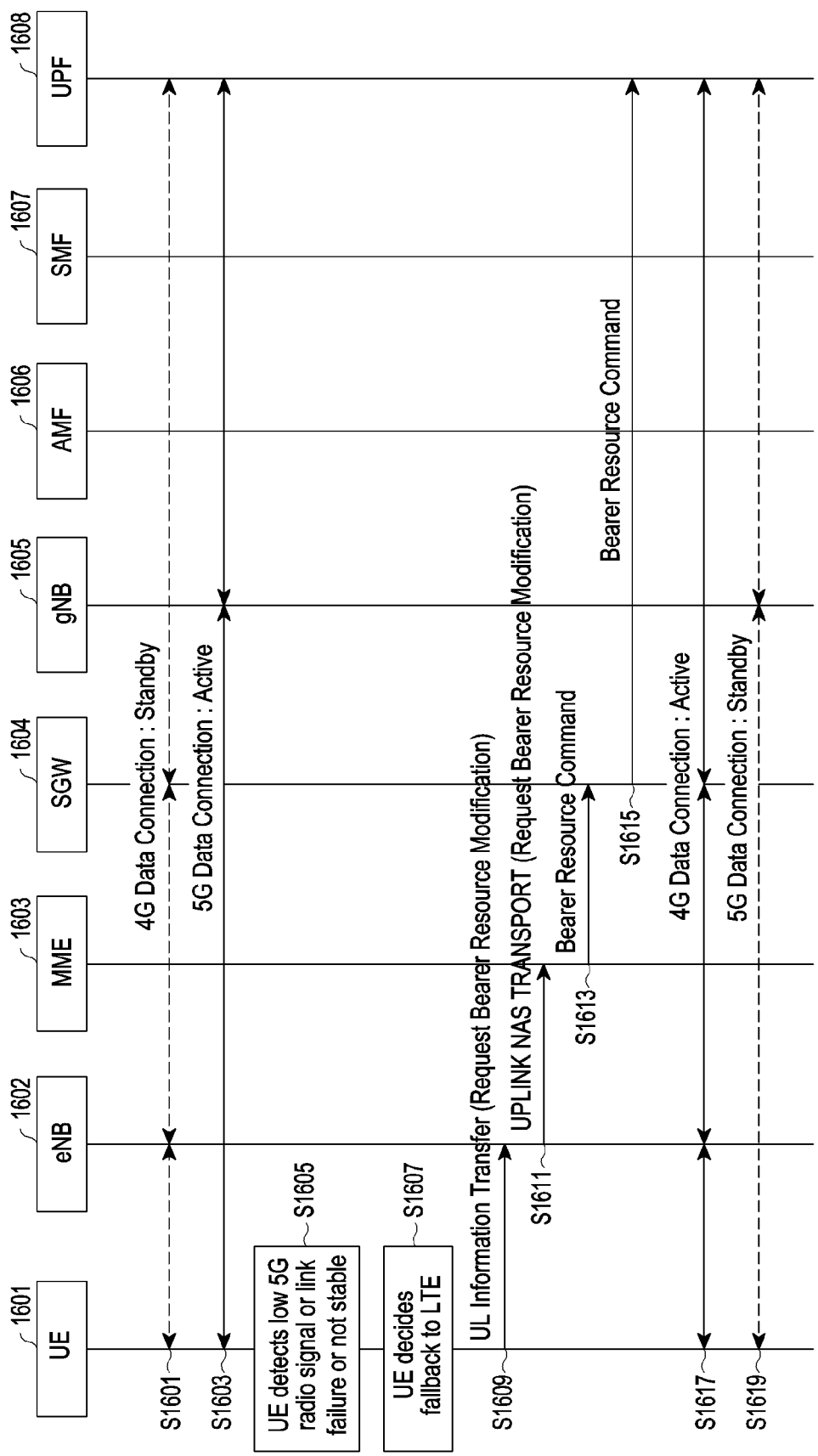
FIG. 16 illustrates a procedure associated with fallback to a 4G system in a wireless communication system.

FIG. 16 is a signal flowchart illustrating a procedure associated with fallback to a 4G system in a wireless communication system, according to the present disclosure.

For example, in an active state of 5G data connection in operation S1603, when a UE 1601 detects interruption or instability of 5G wireless connection (e.g., a low signal strength) in operation S1605, the UE 1601 may determine a fallback to the 4G system in operation S1607. For a fast fallback to the 4G system, 4G connection standby may be maintained. In the absence of 4G traffic, 4G connection may be maintained during tens of seconds by using an inactivity timer.

To maintain the standby state of 4G connection, an eNB 1602 may set the inactivity timer longer when the UE 1601 is connected to 5G. Alternatively, instead of setting the inactivity timer longer, the eNB 1602 may update the inactivity timer before expiration of the inactivity timer through periodic transmission of a dummy packet by a UPF 1608. For example, in FIG. 16, a fallback time from S1609 to S1617 may be about 25 ms to about 35 ms.

Figure 17:
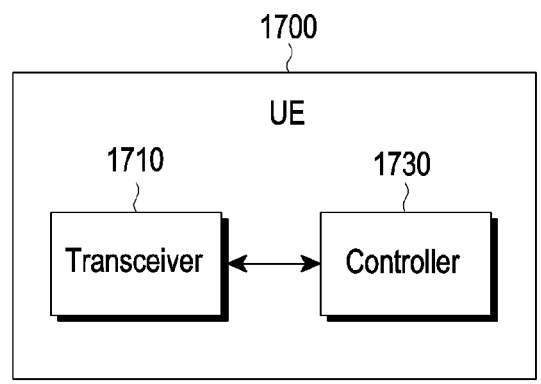
FIG. 17 is a block diagram of a UE.

FIG. 17 is a block diagram of a UE according to the present disclosure.

As illustrated in FIG. 17, a UE 1700 may include a transceiver 1710 and at least one controller 1730.

The controller 1730 may be a central processing unit (CPU) or a semiconductor device that processes a command stored in a memory.

The controller 1730 may control all operations of the UE 1700. The controller 1730 may execute operations of the UE 1700 by reading and executing a program code stored in the memory.

The UE 1700 may further include at least one of a user input device, a data communication bus, or a user output device. The above-described respective components may perform data communication through the data communication bus.

The UE 1700 may further include a network interface connected to the network and the memory. The memory may include various forms of a volatile or non-volatile storage medium. For example, the memory may include read only memory (ROM) or random access memory (RAM).

Figure 18:
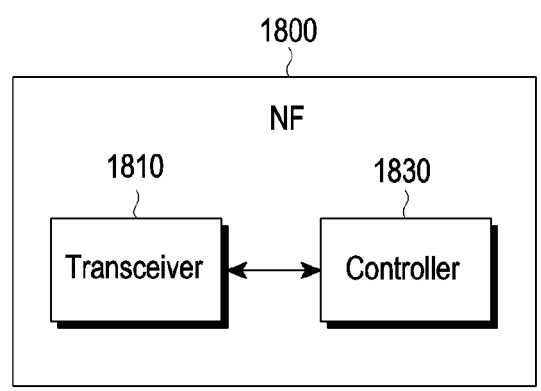
FIG. 18 is a block diagram of a BS.

FIG. 18 is a block diagram of a network function (NF), according to the present disclosure.

As illustrated in FIG. 18, the NF may include a transceiver and at least one processor. The NF may be a RAN BS, an MME, an SGW, an HSS, an UDM, a PGW-C, an SMF, a PGW-U, an UPF, an AMF, or a collocated function.

As illustrated in FIG. 18, an NF 1800 may include a transceiver 1810 and at least one controller 1830.

The controller 1830 may be a CPU or a semiconductor device that processes a command stored in a memory.

The controller 1830 may control all operations of the NF 1800. The controller 1830 may execute operations of the UE by reading and executing a program code stored in the memory.

The NF 1800 may further include at least one of a user input device, a data communication bus, or a user output device. The above-described respective components may perform data communication through the data communication bus.

The NF 1800 may further include a network interface connected to the network and the memory. The memory may include various forms of a volatile or non-volatile storage medium. For example, the memory may include ROM and RAM.

In a wireless communication system supporting interworking between a 4G network and a 5G network based on dual registration according to various embodiments of the present disclosure, a UE may determine a system for use in a network depending on a service type and a traffic type when using a 4G system and a 5G system at the same time, and establish a network transmission path for data delivery.

As a result, a mobile communication operator according to various embodiments of the present disclosure may efficiently use the 4G network and the 5G network without a loss in introduction of 5G.

Moreover, it is possible to allocate and manage a network resource flexibly while satisfying a user-desired service level by reflecting service requirements, an operator policy, etc., requested by the UE without changing 5G and 4G BS implementation through addition of an NF such as an SMF, a UPF, etc. Without changing functions of a 5G BS and a 4G BS, different QoS and transmission path units may be supported in a 5G network and a 4G network.

A radio access system supporting multi-RAT according to various embodiments of the present disclosure may efficiently select a 4G system and a 5G system according to a service type requested by a UE, an operator policy, a network status, allow the UE to use the selected system, and change a data transmission path of the UE without changing 5G and 4G BS implementation, in application of interworking between the 4G network and the 5G network.

Moreover, a wireless communication system according to various embodiments of the present disclosure may provide an apparatus and method for controlling a data transmission path between a 4G network and a 5G network depending on a service type requested or used by the UE.

A method according to various embodiments of the present disclosure may be implemented in a manner executable on a computer.

Meanwhile, according to various embodiments of the present disclosure, a method for applying interworking between a 4G network and a 5G network based on dual registration in a wireless radio system may be implemented with a computer-readable code on a computer-readable recording medium. The computer-readable recording medium may include any type of recording device that stores data interpretable by a controller. For example, the computer-readable recording medium may include read-only memory (ROM), random-access memory (RAM), a magnetic tape, a magnetic disk, flash memory, an optical data storage device, etc. In addition, the computer-readable recording medium may be stored and executed as a code that is distributed over a UE connected through a computer communication network and is readable in a distributed manner.

As described herein, various components or modules in the entity, function, eNB, load manager, or UE may be operated using a hardware circuit, e.g., a complementary metal oxide semiconductor-based logic circuit, firmware, software, and/or using a hardware circuit such as a combination of hardware, firmware, and/or software embedded in a machine-readable medium. For example, various electric configurations and methods may be carried out by using electric circuits such as transistors, logic gates, and an Application Specific Integrated Circuit (ASIC).

While embodiments of the present disclosure have been described, various changes may be made without departing the scope of the present disclosure. Therefore, the scope of the present disclosure should be defined by the appended claims and equivalents thereof, rather than by the described embodiments.

The invention claimed is:

1. A method by an apparatus for supporting communication of a user equipment (UE) that dually accesses a 4th-Generation (4G) communication system and a $5^{th}$-Generation (5G) communication system, the operation method comprising:
  receiving a create session request message for traffic transmission from the UE;
  determining a target communication system from among the 4G communication system and the 5G communication system based on system information configured for each service, wherein the target communication system is used to create a data path for the traffic transmission from the UE;
  setting the data path in the target communication system; and
  transmitting a create session response message corresponding to the data path, wherein the create session response message includes the system information configured for each service.

2. The method of claim 1, wherein the apparatus is one of a session management function (SMF) of the 5G communication system, a packet data network (PDN) gateway (PGW)-control (PGW-C) of the 4G communication system, or an SMF/PGW-C collocated function.

3. The method of claim 1, wherein the create session request message is received from the UE through any one of a mobility management entity (MME) of the 4G communication system or an access and mobility management function (AMF) controller of the 5G communication system.

4. The method of claim 1, wherein the target communication system is determined, further based on a type of the traffic transmission from the UE.

5. The method of claim 1, wherein the target communication system is determined further based on any one of an operator policy, a load status, or a UE subscriber class.

6. The method of claim 1, wherein the setting of the data path in the target communication system comprises:
  transmitting a data path setup request message to a user plane function (UPF) or a packet data network (PDN) gateway (PGW)-user (PGW-U) of the target communication system.

7. The method of claim 1,
  wherein the create session response message is transmitted to any one of a mobility management entity (MME) of the 4G communication system or an access and mobility management function (AMF) of the 5G communication system, and
  wherein the create session response message comprises information about the target communication system.

8. An apparatus for supporting communication of a user equipment (UE) that dually accesses a 4th-Generation (4G) communication system and a $5^t$-Generation (5G) communication system, the apparatus comprising:
  a transceiver; and
  a controller coupled with the transceiver configured to control to:
    receive a create session request message for traffic transmission from the UE,
    determine a target communication system from among the 4G communication system and the 5G communication system based on system information configured for each service, wherein the target communication system is used to create a data path for the traffic transmission from the UE, set the data path in the target communication system, and transmit a create session response message corresponding to the data path, wherein the create session response message includes the system information configured for each service.

9. The apparatus of claim 8, wherein the apparatus is one of a session management function (SMF) of the 5G communication system, a packet data network (PDN) gateway (PGW)-control (PGW-C) of the 4G communication system, or an SMF/PGW-C collocated function.

10. The apparatus of claim 8, wherein the create session request message is received from the UE through any one of a mobility management entity (MME) of the 4G communication system or an access and mobility management function (AMF) of the 5G communication system.

11. The apparatus of claim 8, wherein the target communication system is determined further based on a type of the traffic transmission from the UE.

12. The apparatus of claim 8, wherein the target communication system is determined further based on any one of an operator policy, a load status, or a UE subscriber class.

13. The apparatus of claim 8, wherein the controller is configured to transmit a data path setup request message to a user plane function (UPF) or a packet data network (PDN) gateway (PGW)-user (PGW-U) of the target communication system.

14. The apparatus of claim 8, wherein the controller is configured to transmit the create session response message to any one of an MME of the 4G communication system or an AMF of the 5G communication system, wherein the create session response message comprises information about the target communication system.

* * * * *